(12) United States Patent
Poeppelmann et al.

(10) Patent No.: US 12,335,413 B2
(45) Date of Patent: Jun. 17, 2025

(54) DEVICES AND METHODS FOR AUTHENTICATION

(71) Applicant: Infineon Technologies AG, Neubiberg (DE)

(72) Inventors: Thomas Poeppelmann, Munich (DE); Armin Krieg, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1026 days.

(21) Appl. No.: 17/330,532

(22) Filed: May 26, 2021

(65) Prior Publication Data
US 2021/0377057 A1    Dec. 2, 2021

(30) Foreign Application Priority Data

May 26, 2020   (DE) .......................... 102020206561.6

(51) Int. Cl.
*G06F 21/00*   (2013.01)
*G06F 21/44*   (2013.01)
*H04L 9/32*    (2006.01)
*H04L 29/06*   (2006.01)

(52) U.S. Cl.
CPC ............ *H04L 9/3273* (2013.01); *G06F 21/44* (2013.01)

(58) Field of Classification Search
CPC .............................. G06F 21/44; H04L 9/3273
See application file for complete search history.

(56) References Cited

U.S. PATENT DOCUMENTS

| | | | |
|---|---|---|---|
| 9,413,356 B1* | 8/2016 | McKinley | H03K 19/17768 |
| 2003/0059050 A1* | 3/2003 | Hohberger | G07F 7/08 380/51 |
| 2011/0182101 A1* | 7/2011 | Bae | G11C 17/18 365/163 |
| 2017/0004333 A1* | 1/2017 | Modave | G06F 21/73 |
| 2017/0126414 A1 | 5/2017 | Goel et al. | |

OTHER PUBLICATIONS

German Patent Office, Office Action issued for DE 102020206561. 6, 11 pgs., date of mailing: Mar. 25, 2021.

* cited by examiner

*Primary Examiner* — Rodman Alexander Mahmoudi
(74) *Attorney, Agent, or Firm* — Banner & Witcoff Ltd.

(57) ABSTRACT

A device has a receiver designed to receive a data packet from a communication partner, a data processor to process the data packet in order to obtain a secret value, a transmitter designed to transmit a transmit message having information based on the secret value to the communication partner, and an authentication device designed to receive a challenge message and to use the secret value to create a response message, wherein the transmitter is designed to create the transmit message to include the response message.

25 Claims, 16 Drawing Sheets

700

Configure the plurality of devices so that each of
the plurality of devices has a data packet and an associated
key, and is configured to perform authentication of a communication
partner with transmission of the data packet to the communication partner,
and with checking of an item of authentication information received
from the communication partner for correspondence with the data
packet using the key so that different data packets and keys are
stored in the plurality of devices on a device-specific or group-specific basis — 710

Fig. 7

DEVICES AND METHODS FOR AUTHENTICATION

TECHNICAL FIELD

Example aspects relate to devices for mutual authentication of the type that is usable, for example, in the consumables sector. Example aspects further relate to a concept for key diversification for secure authentication.

BACKGROUND

Counterfeits are a major issue in end consumer markets with consumables. A high risk exists of counterfeiting companies creating clones of devices, in particular authentication chips, which behave in exactly the same way as an original device. In systems of this type, it may be possible that the acquisition of a secret key (by whatever means) enables the manufacture of clones which operate on a plurality of consuming devices. Blacklisting (exclusion of specific devices) is not always possible here. If clones appear on the market, there are only limited possibilities for identifying them and preventing their use, since they behave in the same way as the original device.

Methods are accordingly desirable which hinder the cloning of consumables.

SUMMARY

According to one example aspect, a device has a receive device, a data processing device, a transmit device and an authentication device. The receive device is designed to receive a data packet from a communication partner. The data processing device is configured to process the data packet in order to obtain a secret value. The transmit device is designed to transmit a transmit message comprising information based on the secret value to the communication partner. The authentication device is designed to receive a challenge message and to use the secret value to create a response message. The transmit device is designed to create the transmit message in such a way that it comprises the response message.

According to a further example aspect, a device which is designed to authenticate a communication partner comprises a data memory, a data interface, a control device and an authentication device. The data memory is designed to store a data packet and a key. The data interface is configured to exchange messages with a communication partner. The control device is designed to read the data packet from the data memory and transmit it by means of the data interface to the communication partner. The authentication device is designed to receive a message comprising authentication information from the communication partner by means of the data interface. The authentication device is designed to check the authentication information for correspondence with the data packet using the key in order to obtain an authentication result. The device is designed to perform a further interaction with the communication partner depending on the authentication result.

A further example aspect relates to a system in each case having at least one of the preceding devices, wherein the devices form mutual communication partners.

Further example aspects relate to methods for providing corresponding devices and to methods for authentication.

Further advantageous example aspects are defined in the dependent patent claims.

BRIEF DESCRIPTION OF THE DRAWINGS

Example aspects are explained below with reference to the attached drawings, wherein:

FIG. 7 shows a schematic flow diagram of a method according to one example aspect which can be implemented to produce a plurality of devices;

DETAILED DESCRIPTION

Before example aspects of the present disclosure are explained in detail below with reference to the drawings, it should be noted that identical, functionally similar or similarly acting elements, objects and/or structures are denoted with the same reference numbers in the different figures so that the descriptions of these elements set out in different example aspects are interchangeable or can be applied to one another.

Example aspects described below are described in connection with a multiplicity of details. However, example aspects can also be implemented without these detailed features. To provide a clearer understanding, example aspects are further described using block diagrams as a substitute for a detailed description. Details and/or features of individual example aspects can simply be combined with one another, unless otherwise explicitly described.

The following example aspects relate to devices and methods which enable authentication of one device in relation to another device. The following example aspects are described by way of example in connection with a consumable which is authenticated by a consuming (or using) device. The consumable can be a device which provides (and, for example, stores) a resource which is consumed when the consuming device (host) is operated. Examples of pairs of a consumable and a consuming device are:

printer cartridge—printer
battery—electrical device which is powered by the battery
refill cartridge—e-cigarette
credit card—prepaid cell phone
coffee capsule—coffee machine
water filter cartridge—water filter.

The consumable contains, for example a (physical) material which is consumed, as in the case of a printer cartridge, specific battery types or an e-cigarette refill cartridge or a medicinal substance (e.g. drug) for a medical device in a corresponding container. In a different aspect, however, the consumable can also contain a non-physical resource which is consumed, such as, for example, a credit, e.g. for a prepaid cell phone.

Figure 1:
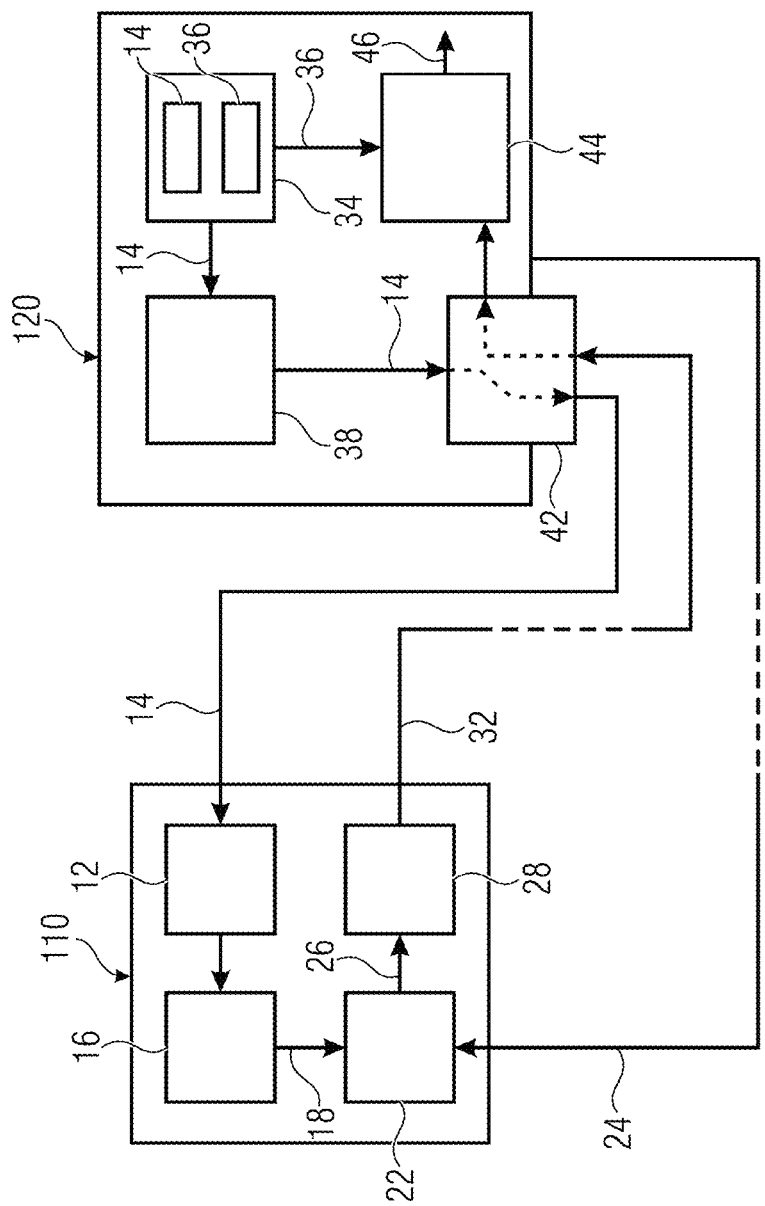
FIG. 1 shows a schematic block diagram of a system according to one example aspect which represents an example of a consumable arrangement.

In this respect, FIG. 1 shows a schematic block diagram of a system which represents an example of a consumable arrangement 100. The system 100 comprises a device 110 according to one example aspect. The device 110 can, for example, provide at least a part of the consumable. The system 100 further comprises a device 120 which is configured to communicate with the device 110 so that the devices 110 and 120 form mutual communication partners. The device 120 can provide at least a part of a consuming device. Alternatively or additionally, the device 110, i.e. the consumable or a device connected thereto, can be a communication partner to be authenticated.

The device 110 can, for example, be physically connected to the device 120, e.g. plugged in or built in or otherwise connected, e.g. via a wired or wireless communication connection such as WiFi®, ZigBee® or Bluetooth® or the like. For this purpose, the device 110 can possibly be interchangeably (in particular detachably) connected to the device 120. In the consumables sector, the manufacturer of the consuming device typically wishes that only consumables manufactured by itself (or by a license holder) are used with the consuming device, so that it is desirable for the device 110 to be authenticated by the device 120.

The device 110 comprises a receive device 12 for this purpose which is configured to receive a data packet 14 from a communication partner. Here, the communication partner is, for example, the device 120. The device 110 further comprises a data processing device 16 which is configured to process the data packet 14 in order to obtain a secret value 18. This means that a value present in the data packet 14, possibly not in clear text, which represents a secret value can be derived from the data packet 14 by means of the data processing in the data processing device 16. The secret value can also be understood as a secret which can be used, for example, to carry out an encryption method or a signature method.

The device 110 comprises an authentication device 22 which is designed to receive a challenge message 24, for example from the device 120 or from a different authorized device. The challenge message can be referred to as a request or prompt during the answering of which the device 110, in particular the authentication device 22, is requested to provide an answer to the challenge message 24 by providing a response message 26 associated with the challenge message 24. Since the content of the response message 26, i.e. the answer, depends on the content of the challenge message 24, authentication of the device 110 can thereby be performed. The authentication device 22 is designed to receive the challenge message 24 and to produce the response message 26 using the secret value 18.

The device 110 further comprises a transmit device 28 which is designed to transmit a transmit message 32 to the device 120. The transmit message 32 comprises the response message 26, so that the transmit message 32 comprises information based on the secret value. It is possible for the transmit message 32 to be produced in such a way that it comprises the secret value 18 itself or any value derived therefrom. The response message 26 can be present in the transmit message 32 similarly in clear text, but can also be encrypted or coded in any way.

The device 120 can be designed to authenticate the device 110. To do this, the device 120 can have a data memory 34 which is designed to store information. At least the data packet 14, for example, and a key 36 are stored in the data memory 34. The key 36 can comprise a bit sequence or a character string or any other value which is to be digitally stored.

The device 120 further comprises a control device which is designed to read the data packet 14 from the data memory 34 and transmit it by means of a data interface 42 to the device 110. The data interface 42 is set up to exchange messages with the device 110 and is configured, for example, to receive the transmit message 32 from the device 110. The challenge message 24 can, for example, also be transmitted with the data interface 42 to the device 110, e.g. whereby the challenge message 24 is provided by an authentication device 44 of the device 120. The authentication device 44 is designed to receive the transmit message 32 from the device 110 by means of the data interface 42. The transmit message 32 has authentication information, in particular the information based on the secret value 18, or the response message 26. The authentication device 44 is designed to check the authentication information for correspondence with the data packet 14 using the key 36 in order to obtain an authentication result 46. The device 120 is designed to perform a further interaction with the device 110 depending on the authentication result 46.

It is thus possible within the system 100 for the device 120 to authenticate the device 110 without having to show knowledge of the secret value 18 in unencrypted form for this purpose. It is thus possible to avoid tapping of secret values from devices 120, in particular by preventing a secret value thereby tapped from being used to create clones which could also be operated in other devices 120.

Unlike systems in which a consuming device receives a public key (PK) and a certificate from the consumable and checks the authenticity of the public key, wherein the secret is stored in the consumable for this purpose in order to be able to generate a response in the consumable to a challenge created by the host, said response then being verified once more in the host using the public key, example aspects remove the need to store the secret value 18 in the device 110 also. Since the secret value 18 is derived from the received data packet 14, the response message 26 can be derived directly from the received data packet 14, thus offering a wide range of possibilities. On the one hand, the need to store the secret value 18 in the device 110 can be eliminated, thereby significantly reducing the times at which an attacker could access the secret value 18. In addition, it is possible to design the secret value 18 in a device-specific manner in relation to the device 120 or in a group-specific manner for a group of devices 120, whereas it differs therefrom for other devices or groups. As a result, a secret value 14 which is nevertheless intercepted by an attacker is valid only for the individual device 120 or the group of devices. However, it is difficult for the manufacturer of a clone to assess during manufacture in which subsequent device this clone is intended to be used. This hampers the usability of the clone.

In other words, the example aspects create a system in which a host checks the authenticity of a device in order to prevent the counterfeiting of consumables (e.g. printer cartridges). Some example aspects can forego a non-volatile memory (NVM) in the device while nevertheless retaining an adequate level of security. Moreover, the system can used for delayed feature activation and for increasing the level of security of an authentication device at low cost. Example aspects thus enable the manufacture of cost-effective authentication devices.

Figure 2:
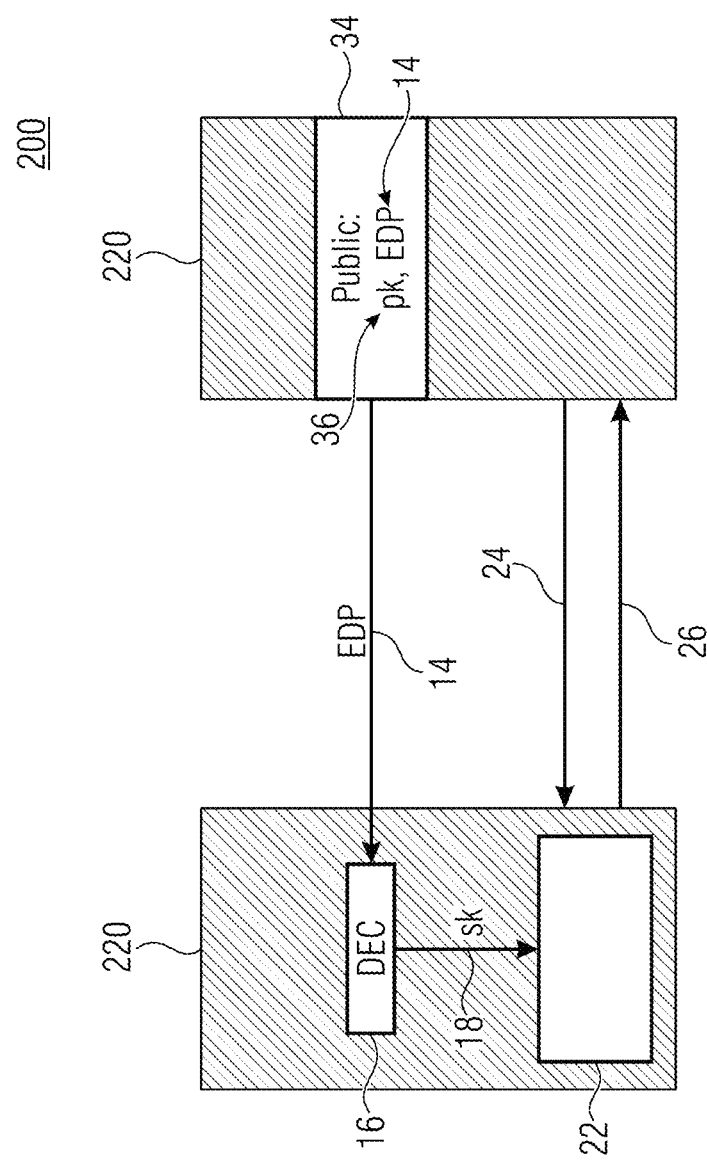
FIG. 2 shows a schematic block diagram of a system according to one example aspect having an authenticating device and a device to be authenticated.

FIG. 2 shows a schematic block diagram of a system 200 according to one example aspect in which the communication partners are implemented by a device 210 formed in accordance with the device 120 and a device 220 which is formed in accordance with the details described for the device 120. The device 210 is, for example, a printer cartridge, whereas the device 220 is, for example, a printer, so that the system 200 provides a consumable arrangement with a consumable and a consuming device. For the sake of improved clarity, not all of the elements thereof which are explained in FIG. 1 are also shown in FIG. 2.

The key 36, for example, and the data packet 14 are stored in the data memory 34. According to one example aspect, the data packet 14 is an encrypted data packet (EDP), although this is not absolutely essential. For this purpose, the data processing device 16 can be configured for decrypting the encrypted data packet 14, i.e. for decoding (DEC). The secret value 18 can thus be a secret key (sk) which is associated with the public key (pk). The authentication device 22 can be designed to generate the response message in answer to the challenge message 24 and using the secret key sk, and to transmit the response message to the device 220 in order to have the authenticity of the device 210 checked, i.e. to enable authentication. The transmit message 32 can be used for the transmission, e.g. by embedding information indicating the response message.

The information stored in the data memory 34 of the device 220 can be stored without particular security measures, since the secret value is not derivable from the information 14 and 36 without knowledge of the specific calculation methods, so that tapping of the information stored in the data memory 34 does not necessarily represent a security risk.

In other words, example aspects are based on the use of keys which are specific to the host (consuming device) rather than consumable-specific keys. The secret value 18/sk is, for example, stored in encrypted form in a data packet (EDP), wherein EDP is equal to ENC(sk), which means that an encryption of the secret value 18 takes place. The device 110 or 120 can obtain the secret value by decrypting EDP and can then use it for authentication. As a result, the device 110 or 120 does not necessarily need a reprogrammable memory, e.g. an NVM (non-volatile memory). This is understood to mean that the device 110 and/or 120 can have memories which can store information in a non-volatile manner also, but these memories are designed so that they always revert to their delivered condition during operation following delivery and cannot be permanently reprogrammed. This means that information can be stored temporarily in the memory, but a permanent modification of the memory content is not necessary or possible. Thus, for example, in the event of a restart or temporary removal of energy supply sources, it is always possible to revert to the delivered condition with the associated permanently stored information. This means that the device 110 and/or 210 can be designed to store the secret value 18 exclusively in a volatile data memory. For this purpose, the device can possibly have no non-volatile memory in the sense of writable memory cells. Alternatively, memory cells of the non-volatile memory can be permanently programmed so that they are unmodifiable following manufacture.

Example aspects further enable the security precautions to be concentrated in the decoding function of the device 110/210, e.g. the data processing device 16, which can be protected through corresponding measures to avoid reverse engineering (reconstruction). The device can be implemented in such a way that a possible attacker cannot recognize the result of the decoding. Physical attacks on the authentication can thus be at least mainly in vain, since an attacker, even if successful, only obtains the key sk (secret 18) of a printer, which does not enable the manufacture of universally usable clones.

The data processing device 16 can be designed to execute an encryption and/or decryption function using a secret key in order to obtain the secret value. An encrypted data packet, for example, can thus be decrypted so that the result of the decryption is again the secret value. Alternatively or additionally, the data processing device 16 can be designed to execute a secret function that is difficult to predict, in order to obtain the secret value 18. A function that is difficult to predict can be understood to mean a function which is unknown according to aspects and/or which modifies the at least one input value in a non-trivial manner that is, where appropriate, unforeseeable for an attacker. Such functions include, for example, a secret function, such as, for example, a hash function. The data packet 14 can thus provide an initial value or basic value as an input value for a hash function.

Example aspects further provide that the data processing device is implemented in an obfuscated manner. This means that, if the secret hash function is implemented, the data processing device 16 can be designed to execute said hash function in an obfuscated manner in order to obtain the secret value. In the case of the encryption and/or decryption function, the data processing device 16 can be designed to execute this function using the secret key and in an obfuscated manner in order to obtain the secret value. This is understood to mean that the sequence of steps in the implementation of the function is concealed in such a way that reverse engineering is at least hindered. A concealment of this type can be implemented in both hardware and software.

Example aspects provide that the secret value 18 comprises an initial value (seed) for generating a private key (sk) of an authentication method. Alternatively or additionally, the secret value 18 can comprise a nonce, i.e. a value which has validity for specific operations and/or for a specific time period. These values can be transmitted in encrypted form, but example aspects also provide unencrypted transmission, since processing (the design of the processing function) of the secret value 18 can similarly be secret so that tapping of the secret value 18 can be problem-free.

The device 110 and/or 210 can be designed to use the private key to create at least a part of the transmit message, in particular the response message 26. Example aspects provide a plurality of possible implementations as authentication methods, including an asymmetric encryption method, wherein a public key is associated with a private/secret key, as described, for example, in connection with FIG. 2. Alternatively or additionally, a signature method can also be used to implement the authentication method.

As already indicated above, the key 36 can comprise a public key of an authentication method. This public key can be associated with the secret value 18, for example in that the secret value 18 is a corresponding or associated private key. The host can be designed to check the authentication information, i.e. the content of the response message 26, without knowing the private key of the authentication method. It is thus possible, for example, for the authentication device 44 of the device 120 or 222 to be designed to transmit the challenge message 24 to the device 110/210 using the data interface 42, to receive the transmit message 32 as the response message which is associated with the challenge message 24 and which was generated using a private key of the authentication method, wherein this private key is unknown to the host itself. The private key can be generated using the secret value, which also entails that the private key is the secret value, and in both cases the private key is obtained from the data packet 14 through further processing in the data processing device 16.

In other words, in one example aspect, the host can be identified by a host ID (HID). The host can be equipped with an encrypted data packet $EDP_{HID}$ during the manufacture or personalization of the host chip or via a software update or via an online interactive channel to a server or via a secure hardware token. The $EDP_{HID}$ is, for example, encrypted with a key k and contains a secret value v, so that the following applies: $EDP_{HID}=Enc_k(v)$. A host is further equipped with a public key pk which corresponds to an $EDP_{HID}$, wherein pk=GEN_PK$_s$ (v) here for a key generation function GEN and the value v applies to a suitable cryptographic function s. However, it should be noted that the host itself does not know the value of v, since only pk and $EDP_{HID}$ are stored in the host. In most practical cases, each host has an individual $EDP_{HID}$ and an individual pk, but these values can sometimes also be shared among (groups of) hosts and hosts could have a plurality of pairs of $EDP_{HID}$ and pk.

In order to check the authenticity of a device which, for example, is attached to a consumable, the host uses a suitable interface (e.g. I2C) which enables communication with a host device. The host then transmits the $EDP_{HID}$ to the device. The device uses, for example, a decryption circuit structure $Dec_k$ to which the following applies: $v=Dec_k(Enc_k(v))$, and can thus obtain the value $v=Dec_k(EDP_{HID})$ using the key k. The device further implements the GEN_SK$_s$(v) function in order to obtain a secret key sk=GEN_SK$_s$(v). GEN_SK$_s$ is the complementary function to GEN_PK$_s$ and enables the calculation of a secret key (SK) for which a public key (PK) can be generated using a suitable method for a public key identification or digital signature scheme s. The following, for example, is assumed here: s=ECDSA-NIST-P256-SHA256 (elliptical curve digital signature algorithm (ECDSA) of the National Institute of Standards and Technology (NIST), standardized prime curve secp256r1 using a secure hash algorithm (SHA) 2 with 256-bit output, as described in FIPS 186-4—Digital Signature Standard (DSS). For this case, sk=GEN_SK$_s$(v) could simply output v and treat this as a secret scalar and thus as a secret key. This is advantageous, since the GEN_SK$_s$(v) function is implemented on the device and is intended to be optimized in terms of performance and circuit size. GEN_PK$_s$ can perform the key generation of the ECDSA algorithm using sk=$d_A$ as a secret key in order to calculate $Q_A=d_A\times G$. It should be noted that GEN_PK$_s$ is not executed on the device or the host, and only the result pk is stored in a host.

After the device has processed the $EDP_{HID}$, the host generates a challenge using the c=CHALL$_s$ function for the scheme s. For s=ECDSA-NIST-P256-SHA256, this challenge c is merely a randomly selected number having a length from e.g. 128 to 256 bits. This challenge is transmitted to the device which executes an r=AUTH$_s$(c, sk) function which uses the challenge c and the secret key sk as input and then returns a response r. For s=ECDSA-NIST-P256-SHA256, this is the ECDSA signature generation function and the response is a signature for the random value c which is provided by the host. The response r is then transmitted to the host and the host executes the VER$_s$(r, pk) function in order to check whether the response is valid. A response can be checked with the public key pk and is valid if the device has demonstrated knowledge of the secret key sk (without revealing sk). In the case of s=ECDSA-NIST-P256-SHA256, the VER$_s$ function performs the signature verification and checks that the signature r can be verified via the challenge c with the public key pk. If the verification is successful, the device is regarded as authentic, and if the verification fails, the device is treated as not authentic. The host could then stop the use of a consumable or could stop its function, since a non-authentic and therefore probably dangerous component has been introduced into the system.

Figure 3:
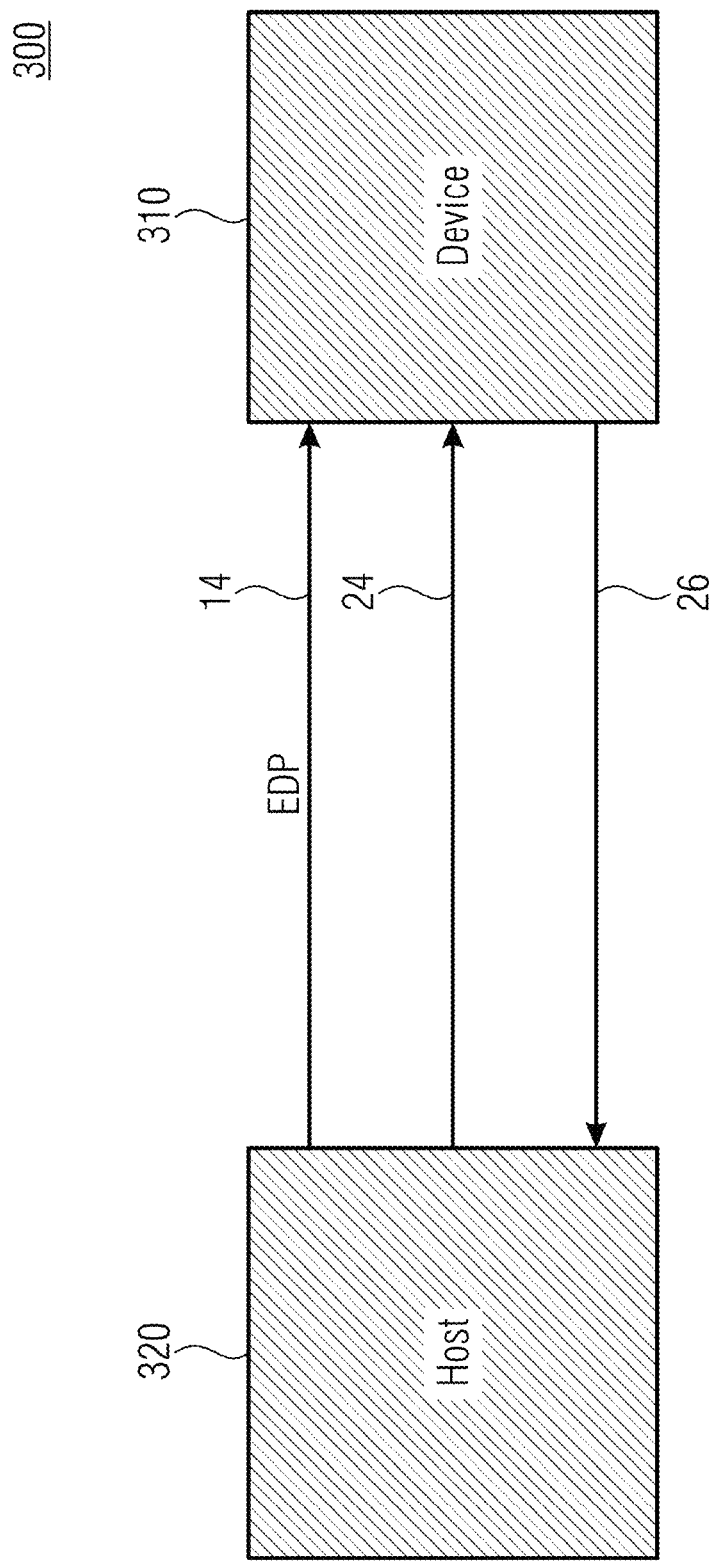
FIG. 3 shows a schematic block diagram of a system according to one example aspect, and a message flow for transmitting a data packet, a challenge message and a response message for authentication.

FIG. 3 shows a schematic block diagram of a system 300 according to one example aspect in which a message flow can be executed in order to transmit the data packet 14, the challenge message 24 and the response message 26 for authentication between a device 310 (device) and a device 320 (host). The device 310 can be designed in accordance with the device 110 and/or 210, while the device 320 can be designed in accordance with the device 120 and/or 220.

Figure 4:
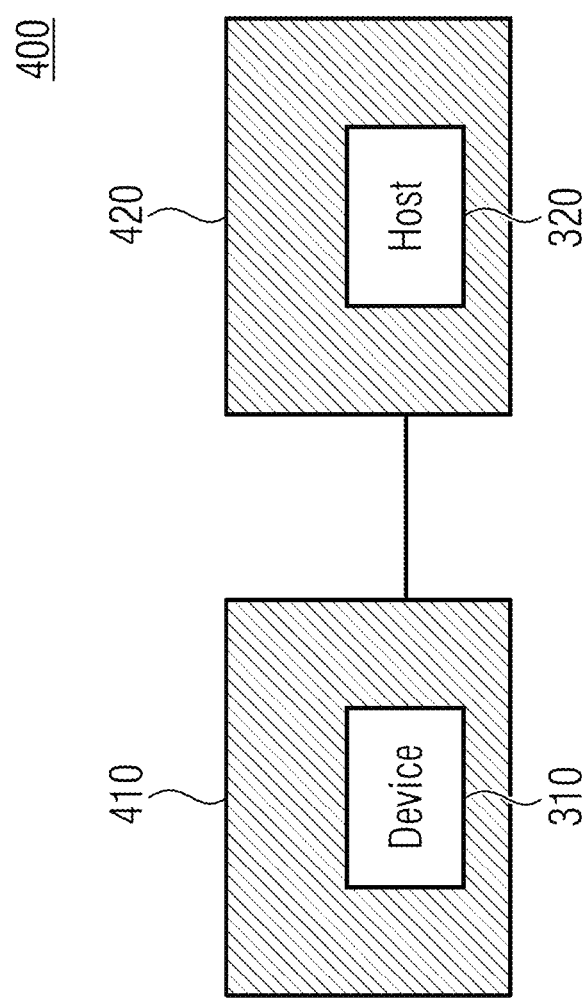
FIG. 4 shows a schematic block diagram of a system according to one example aspect which has a consumable and a consuming device.

FIG. 4 shows a schematic block diagram of a system 400 according to one example aspect which has, for example, a consumable 410 and a consuming device 420. The consumable 410 can, for example, be coupled to the device 310, while the device 320 can be coupled to the consuming device 420 or can form a part thereof, so that the resource stored by the consumable 410 and its consumption can be authenticated by the device 420. The system 400 can thus be any consumable arrangement, for example as a battery 410 which supplies an electrical consumer 420, for example in automobiles, with electric current.

In other words, systems described herein can be used for device authentication and can provide the unique feature that a device does not require an NVM in order to achieve key diversification. A private key, for example, is stored in a protected manner in a device in an NVM and the host can access a public key and a certificate in order to execute an authentication protocol on a challenge and response basis. An NVM could mean prohibitively high additional costs for a device. On the other hand, it is desirable to use different keys for the public key authentication mechanism in order to prevent an attacker from building clones using extracted secret keys. Furthermore, no security control is required on the host side, since the host does not process any secrets. This would be the case if a symmetric challenge-response scheme were used for the authentication, see e.g. FIG. 2.

This problem can be overcome with the basic idea of storing a host-specific public key (pk) and the host-specific encrypted secret key $EDP_{HID}$ in the host. Assuming that an attacker is not able to penetrate the $Dec_k$ functionality, it is not economically viable to produce cloned devices. In this sense, penetration means reverse engineering of the algorithm Dec and extraction of the secret key k (it should be noted that the algorithm and the key can be amalgamated into one circuit block). $Dec_k$ can be protected as follows:

Countermeasures are therefore devised against the cloning of the $DEC_k$ circuit, for example measures which increase the risk that, in the event of a counterfeiting of the circuit, the counterfeit (cloned) circuit will be defective, i.e. clone errors will occur.

For this purpose, techniques can be employed which make the cloning of digital implementations as error-prone as possible. Techniques provide the integration of circuit blocks which could be cloned theoretically or only with substantial effort. One example relates to special cells with particular characteristics for hindering analysis or physical unclonable functions (PUFs).

The $Dec_k$ circuit can also be implemented using standardized block ciphers, such as Advanced Encryption Standard (AES) or Data Encryption Standard (DES), or variants of such algorithms (different s-boxes, number of rounds, different constants). It could further use stream ciphers, such as e.g. Trivium, or sponge-based constructs, such as SHA3/Keyak, or variants of such algorithms. A device could also implement variants or different instantiations of $Dec_k$ (e.g. for different market segments).

Even if an attacker obtains a value v or a secret key sk and produces a clone with these values, this clone will operate only with one specific host. The reason for this is that each host accepts only one host-specific public key. A cloned device clone would not operate with a different host, since the host is in possession of a different EDP and pk. The attacker is not able to manufacture universally operating clones without complete extraction/reverse engineering of the $Dec_k$ circuit structure. It should be noted that the description of the circuit of $Dec_k$ and $Enc_k$ is not present on the host. The host is equipped only with an $EDP_{HID}$, but the encryption is performed in a protected environment. It is consequently possible to save effort on the physical protection of sk=$GEN\_SK_s$(v) and $AUTH_s$(c, sk). If the effort made to obtain these values is great enough (e.g. an unpacking of the device is required), only a small fraction of owners of the host will purchase cloned devices and provide such clones themselves. Counterfeit goods will furthermore always be identified and the owner of the host will notice that the device is not authentic.

Figure 5:
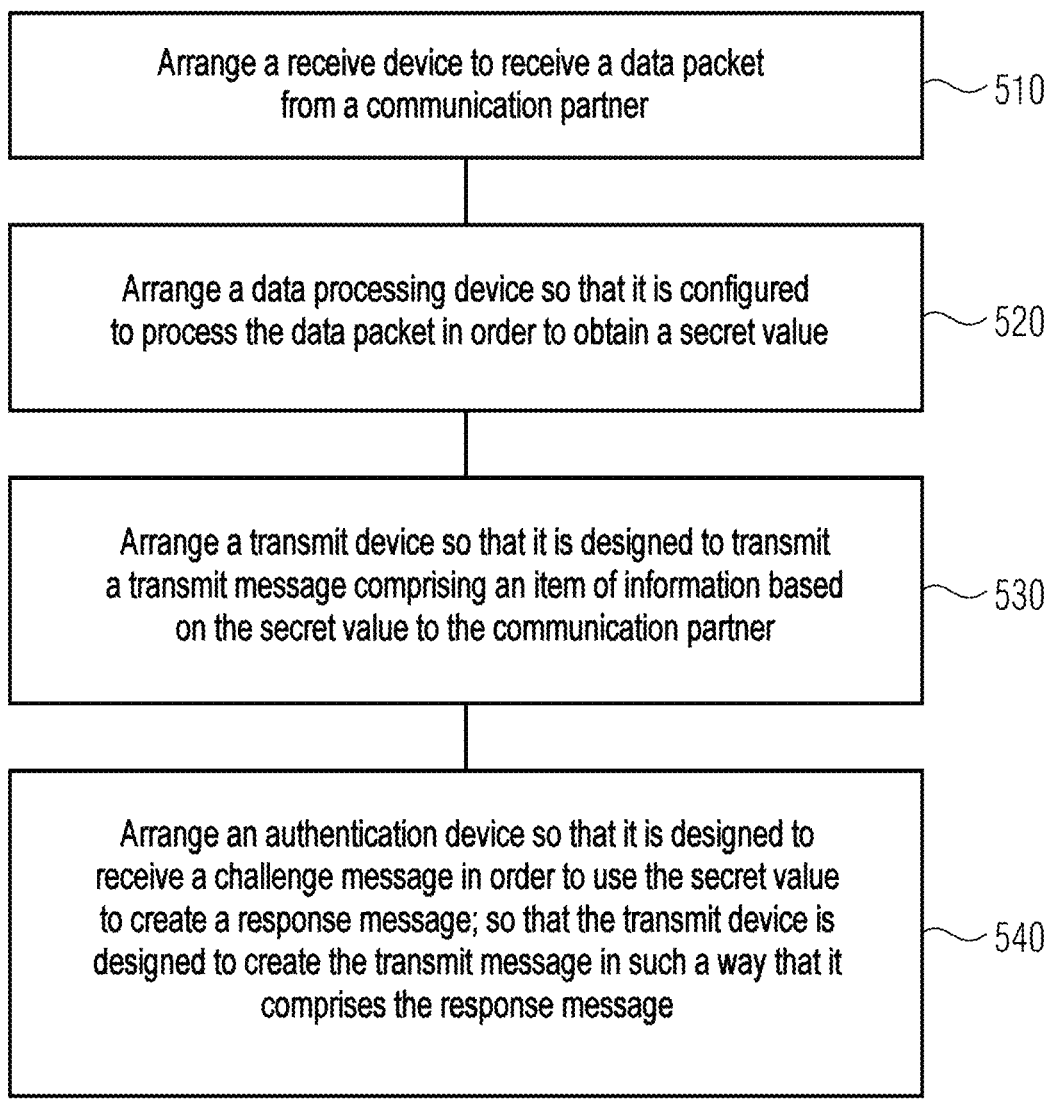
FIG. 5 shows a schematic flow diagram of a method for providing a device which is to be authenticated.

FIG. 5 shows a schematic flow diagram of a method for providing a device, e.g. the device 110, 210 or 310. A step 510 comprises arranging a receive device to receive a data packet from a communication partner. A step 520 comprises arranging a data processing device so that it is configured to process the data packet in order to obtain a secret value. A step 530 comprises arranging a transmit device so that it is designed to transmit a transmit message comprising information based on the secret value to the communication partner. A step 540 comprises arranging an authentication device so that it is designed to receive a challenge message in order to use the secret value to create a response message so that the transmit device is designed to create the transmit message in such a way that it comprises the response message.

Figure 6:
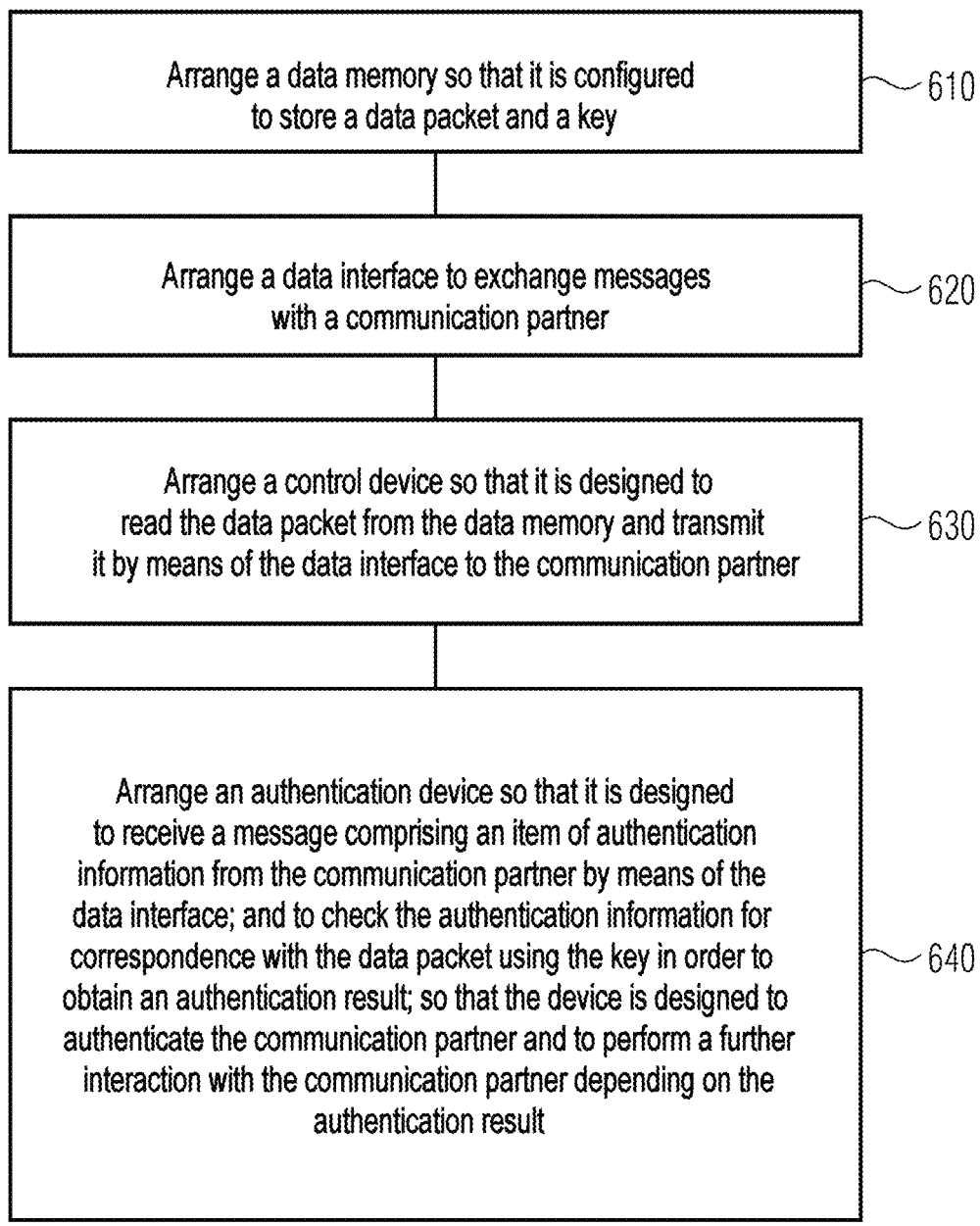
FIG. 6 shows a schematic flow diagram of a method for providing an authenticating device.

FIG. 6 shows a schematic flow diagram of a method 600 for providing a device, e.g. the device 120, 220 or 320. A step 610 comprises arranging a data memory so that it is configured to store a data packet and a key. A step 620 comprises arranging a data interface to exchange messages with a communication partner. A step 630 comprises arranging a control device so that it is designed to read the data packet from the data memory and transmit it by means of the data interface to the communication partner. A step 640 comprises arranging an authentication device so that it is designed to receive a message comprising authentication information from the communication partner by means of the data interface. The step is further carried out in such a way that the authentication device is designed to check the validity of the authentication information with reference to the data packet using the key in order to obtain an authentication result so that the device is designed to authenticate the communication partner and to perform a further interaction with the communication partner depending on the authentication result.

The method 600 can be carried out multiple times in order to provide a plurality of devices. A method carried out multiple times in this way can further be designed so that device-specific or group-specific storage of a data packet associated with the group or device and a key associated with the data packet takes place. The key can, for example, be associated with the data packet insofar as a further key associated with the key is also generated for the data packet. It can thus be configured that the data packets and the associated key differ between devices or groups so that, even if a clone is successfully created, the usability of said clone will be hindered.

FIG. 7 shows a schematic flow diagram of a method 700 which can be implemented to produce a plurality of devices. In a step 710, the plurality of devices are configured so that each of the plurality of devices has a data packet and an associated key, and is configured to perform authentication of a communication partner with transmission of the data packet to the communication partner, and possibly a challenge message also, and with checking of authentication information received from the communication partner for correspondence with the data packet using the key. The method is carried out in such a way that different data packets and keys are stored in the plurality of devices on a device-specific or group-specific basis.

The method 700 can be carried out in such a way that unauthorized tapping of a secret value contained in the data packet or a secret value derived from the data packet and transfer of the secret value onto a clone of the communication partner results in a positive authentication result at most for the device or the corresponding group of devices if the clone is used. In order to achieve this, the challenge message refers to the secret value so that other devices or groups transmit a different authentication message and therefore expect the use of a different secret value, which cannot be accomplished by the tapped secret value.

Figure 8:
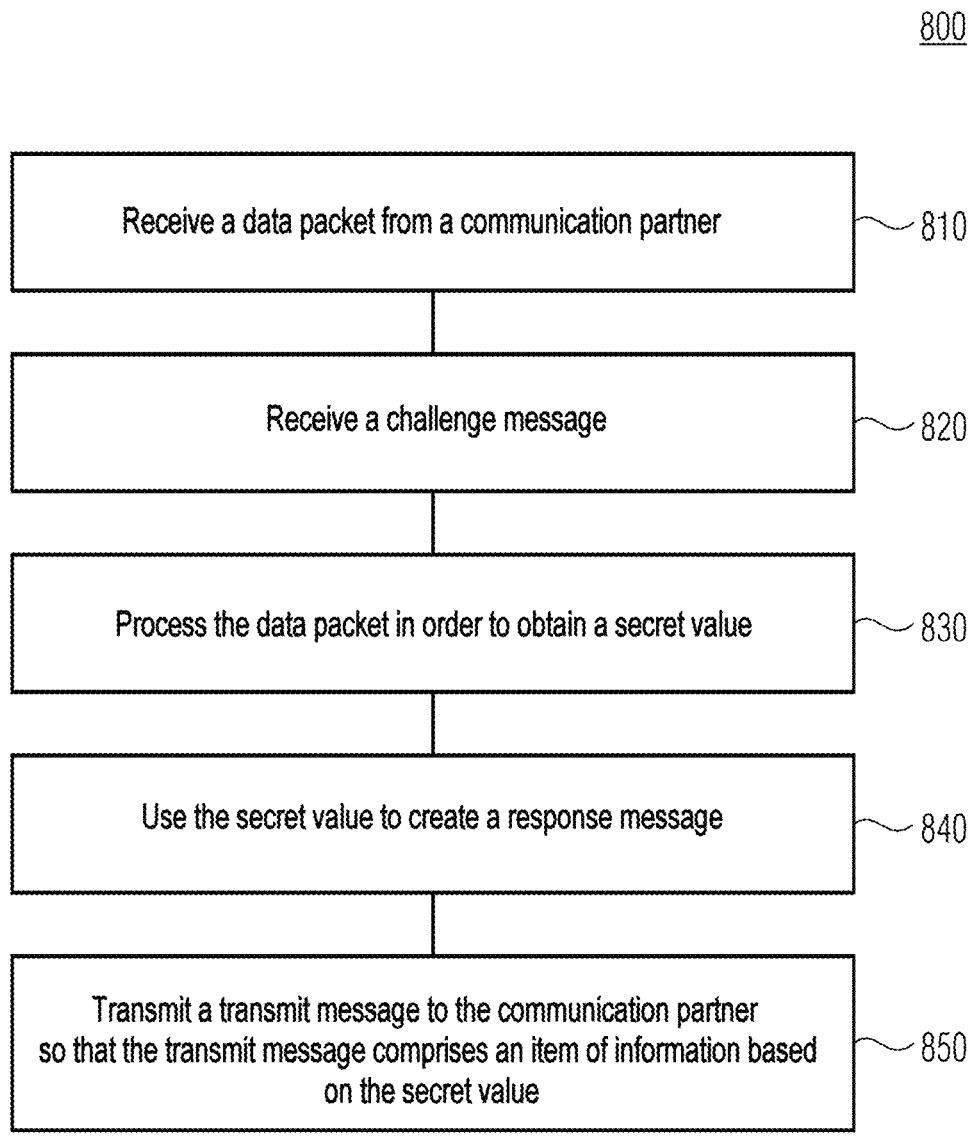
FIG. 8 shows a schematic flow diagram of a method according to one example aspect which can be implemented, for example, by the device from FIG. 5.

FIG. 8 shows a schematic flow diagram of a method 800 according to one example aspect which can be carried out, for example, by a device described herein, e.g. the device 110, 210 or 310, but can also be implemented independently from these devices. A step 810 comprises receiving a data packet from a communication partner. A step 820 comprises receiving a challenge message. A step 830 comprises processing the data packet in order to obtain a secret value. A step 840 comprises using the secret value to create a response message which can represent an answer to the challenge message. A step 850 comprises transmitting a transmit message to the communication partner so that the transmit message comprises information based on the secret value.

Figure 9:
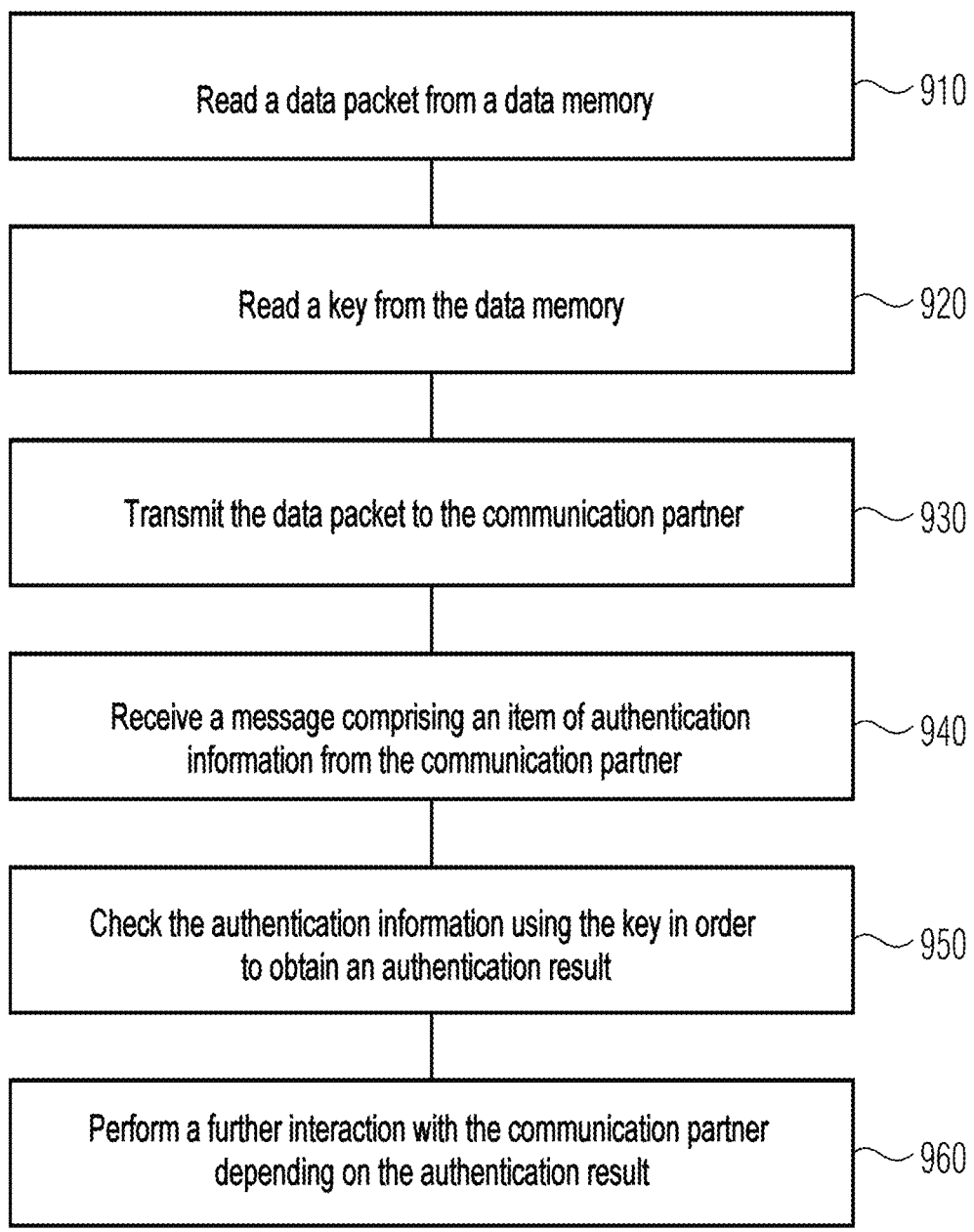
FIG. 9 shows a schematic flow diagram of a method according to one example aspect which can be used to authenticate a communication partner.

FIG. 9 shows a schematic flow diagram of a method 900 according to one example aspect which can be applied to authenticate a communication partner and can be implemented, for example, by the device 120, 220 or 320, but also independently therefrom. A step 910 comprises reading a data packet from a data memory. A step 920 comprises reading a key from the data memory. A step 930 comprises transmitting the data packet to the communication partner. A step 940 comprises receiving a message from the communication partner, wherein the message comprises authentication information. A step 950 comprises checking the authentication information using the key in order to obtain an authentication result. A step 960 comprises performing a further interaction with the communication partner depending on the authentication result.

Figure 10:
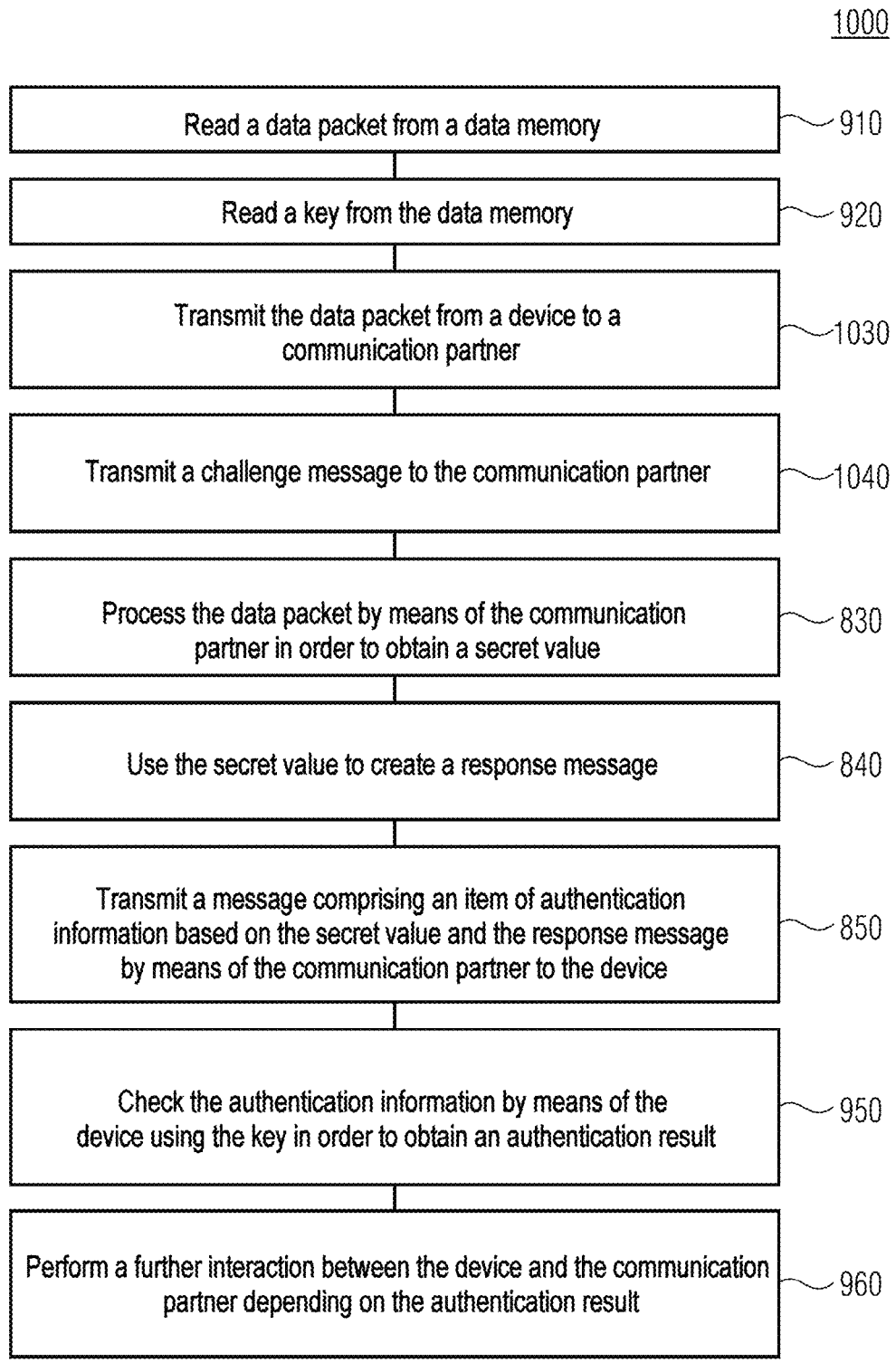
FIG. 10 shows a schematic flow diagram of a method according to one example aspect which combines steps of the methods from FIG. 8 and FIG. 9.

FIG. 10 shows a schematic flow diagram of a method 1000 according to one example aspect. The method 1000 can comprise the steps 910 and 920. In a step 1030, the data packet read in step 910 can further be transmitted from a device to a communication partner, e.g. to the device to be authenticated. This data packet can, for example, be received from the device in step 810. A step 1040 comprises transmitting a challenge message to the communication partner which can be received, for example, in step 820.

The method further comprises steps 830, 840 and 850 in which the received information is processed in order to obtain the secret value, to create the response message therefrom and to create the transmit message which comprises the authentication information based on the secret value. The method 1000 further comprises steps 950 and 960 in which the authentication information is checked and the further interaction is performed depending on the authentication result.

It should be noted that, in the methods described above, a sequence of the steps can differ from the sequences shown in the figures. Thus, for example, the implementation of a time or a sequence of the reading of information may differ from that shown. Individual calculation steps can also be performed in a different sequence.

Figure 11:
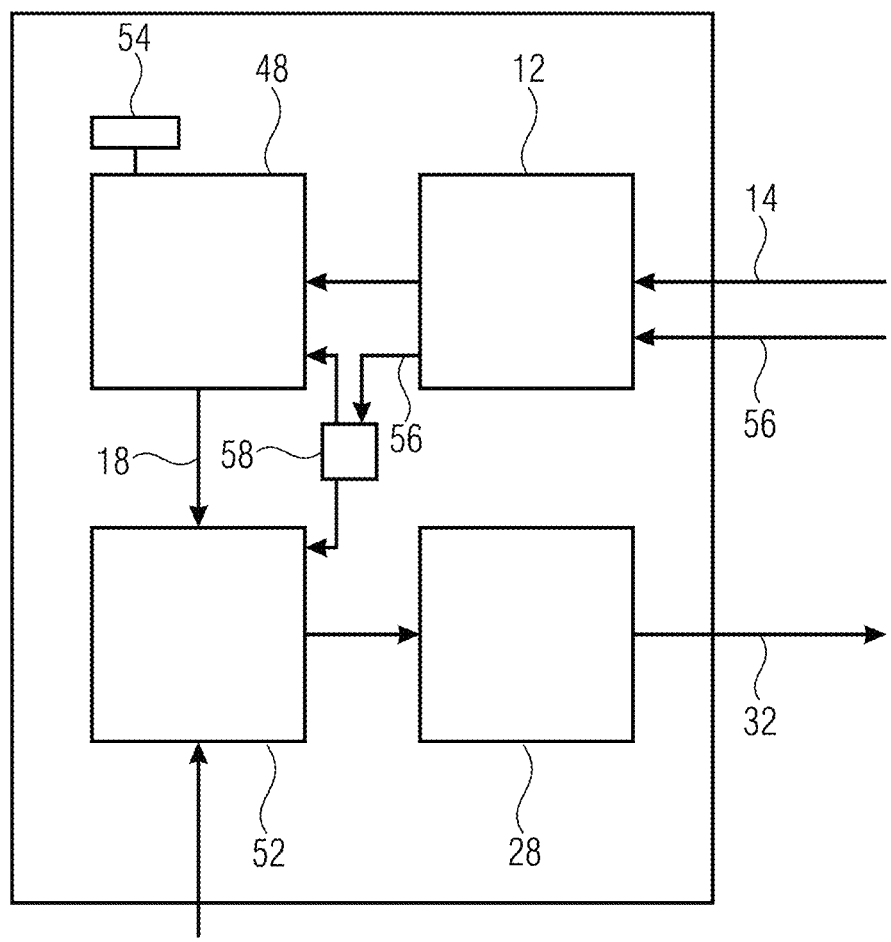
FIG. 11 shows a schematic block diagram of a device according to one example aspect.

Example aspects described above are based at least partially on the notion that the production of clones is hindered by first generating the secret value in the device which is to be authenticated. Further example aspects relate to the provision of functions in the device which pose or increase the risk that a clone will not be operated or will only be operated defectively in a subsequent device. This can include, for example, physical countermeasures, wherein the example aspects provide, in particular, the implementation of hidden functions which are activated at a later time. According to one example aspect, it is provided that methods or processes for obtaining secret values and/or for authentication are modified in ongoing operation. Example aspects thus provide devices which are designed to receive a selection message. This involves, for example, developments of the device 110, 210, 310 or 410. A device of this type can have a data memory which is designed to provide a key for the data processing device 16. The device can be designed to modify the key in response to the selection message. A device of this type is shown by way of example in FIG. 11 as a schematic block diagram. The device 1100 shown there can comprise the receive device 12 and the transmit device 28 described in FIG. 1. The device 1100 has a data processing device 48 which is modified compared with the data processing device 16, and/or an authentication device 52 which is modified compared with the authentication device 22. The data processing device 16 can optionally be arranged instead of the data processing device 48, or the authentication device 22 can be arranged instead of the authentication device 52. The device 1100 can optionally have a data memory 450 which is designed to store one or more keys, i.e. bit sequences. These keys can be used by the data processing device 48 or 16 in order to obtain the secret value.

The device 1100 can be designed to receive the selection message 56, for example by means of the receive device 12. In response to the selection message, the device can be designed to use a different key from the data memory 54 in order to provide it to the data processing device 48 or 16. This means that the key can be modified to receive the secret value 18 in response to the selection message 56. This enables the subsequent modification of the structure of the data packet 14 in ongoing operation also. A configuration of the host (device 120, 220 or 320), for example, can thus be modified in ongoing operation.

The use of clones, even with corrupted or stolen keys, can thus be hindered.

Alternatively or additionally, it is provided in example aspects that the data processing device 48 has one or more processing logic circuits which are configured to provide or implement a plurality of variants of a logic function for processing the data packet. The device 1100 can have a selection device 58 which is configured to end the use of a first variant of the logic function for processing in the data processing device 48 and to begin the use of a second variant of the logic function for processing the data packet 14 in response to the reception of the selection message 56. Alternatively or additionally, the authentication device 52 can have one or more authentication logic circuits which are configured to implement a plurality of variants of a logic function for authenticating the device. The selection device 58 can be designed to end the use of a first variant of the logic function for authentication and to begin the use of a second variant of the logic function for an authentication in response to the reception of the selection message 56.

In other words, the manner in which the data packet 14 is evaluated or processed can be modified and/or the manner in which the response message is generated can be modified in response to the selection message 56, thus offering a high level of security.

The selection device 58 can be designed to receive and evaluate the selection message 56. The selection device 58 can be designed to verify the selection message 56, which means ensuring that it originates from a trusted source. The selection device 58 can be designed to end the first variant of the logic function in the data processing device 48 and/or the authentication device 52 and to replace it with a different variant, i.e. to begin said variant, only if the verification is successful. Different options are available for the verification. An encryption, decryption or signature, for example, can thus be used. Example aspects provide that the selection device 58 is designed to determine a hash value based on the selection message 56 using a hash function, and to classify the verification as successful if the hash value corresponds to a predetermined hash value. This is equivalent to classifying the verification as unsuccessful if the hash value does not correspond to the predetermined value. Alternatively or additionally, the hash value can also be checked for correspondence within a tolerance range, i.e. whether the hash value lies within a predetermined value range, in each case with and/or without the value range limits.

The selection message 56 can be transmitted, for example, from a correspondingly configured device 120, 220 or 320. This device can be designed to transmit the selection message 56 to the communication partner, i.e. the consumption device, such that said message contains an instruction to modify a key for processing the data packet in response to the selection message 56. Alternatively or additionally, the selection message 56 can contain an instruction to end the use of a first variant of a logic function for processing the data packet and to begin the use of a second variant of the logic function for processing the data packet in response to the reception of the selection message 56. Alternatively or additionally, the selection message 56 can contain an instruction to end the use of a first variant of a logic function for authentication and to begin the use of a second variant of the logic function for authentication in response to the reception of the selection message 56.

Any number of logic functions can be provided in the data processing device 48 and/or the authentication device 52, for example at least two, at least three, at least five, at least ten or any other number.

The logic function variants, i.e. the individual circuits or the sub-circuits implementing the logic function variants, and also the selection device 58 can be protected against reverse engineering by means of a suitable countermeasure. An example of a countermeasure of this type is a contact hole camouflage in which contact holes are provided between different layers of a chip which do not however establish contact between the layers and therefore mislead a counterfeiter in respect of connections present in the respective sub-circuit. The logic functions can, for example, be cryptographic logic functions, but can generally implement any digital function which manipulates data. The risk of clone errors can be increased by means of a cryptographic logic function, since such a function typically has the characteristic that it is highly probable that the modification of an input bit will result in the modification of many output bits of the logic function. Alternatively or additionally, obfuscation measures can be used, for example with contact hole camouflage in other device parts also, e.g. the data processing device 16 or parts thereof, that is, such measures are not limited or restricted to the delayed feature activation function.

The selection function 56 can be implemented using a cryptographic hash function or a permutation. The use of a different logic function variant is protected, for example, by an activation mechanism in which the host authentication circuit 44 (for example initiated by a user) feeds an unlocking password or an unlocking code to the consumable authentication circuit 52 which is hashed by the consumable authentication circuit 52 using a hash function and is stored with a reference value (for this logic function which is to be activated) in the consumable authentication circuit 52. The host authentication circuit 44 can generally activate the use of a different logic function variant by providing evidence of knowledge of a secret (such as a password or a release code) to the consumable authentication circuit 52. Only if the generated hash value matches the reference value which is associated with the function variant to be activated, the consumable authentication circuit or the selection device 58 performs the selection of the logic function variant.

In other words, according to example aspects, authentication systems can also be used in a scenario in which logic is introduced with clone countermeasures which are not active as from the initial market launch. In this case, a logic block is protected against reverse engineering and is not used in the market launch. Since the logic is not used during the initial operation and is also protected against use, the risk of reverse engineering errors is substantially increased. The advantage here is that a reverse engineering company does not possess the means to verify the correctness of extracted logic. At least one additional round of reverse engineering must inevitably take place at a later stage, which means increased cost and effort for the production of device clones.

In one example aspect of this type, a device can be equipped with a functionality for asymmetric challenge-response authentication which can be the same as in the described system or which can be independent—but uses different pk1/sk1 pairs. This basic authentication system can be used immediately after the market launch.

Figure 12:
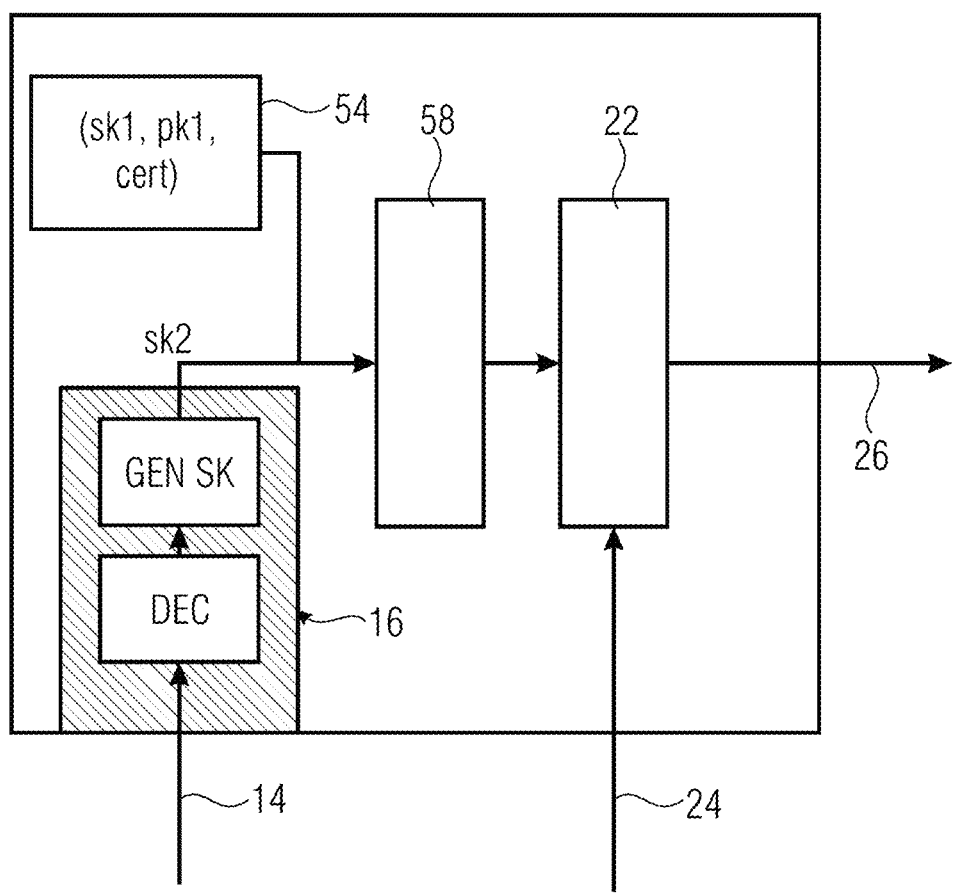
FIG. 12 shows a schematic block diagram of a device according to one example aspect which has additional protection mechanisms.

For this purpose, FIG. 12, for example, shows a schematic block diagram of a device 1200 according to one example aspect. Although not all elements are shown, the device 1200 can have a functionality which is explained, for example, in connection with the devices 110, 210 or 310.

The $Dec_k$ block is the aforementioned logic which is first activated in order to hinder reverse engineering. It is configured to reject incorrectly coded $EDP_{HID}$ data, and the host has no access to this information at the market launch. The host cannot therefore use the $Dec_k$ logic block, and reverse engineering is complicated. A specific time after the market launch of the device and host unit, the host then receives the $EDP_{HID}$ and pk2, for example in the form of a selection message 56, for example by means of a software update. Since the host-specific $EDP_{HID}$ data packet is correctly coded, it can be processed by $Dec_k$. The host can then use the authentication with the scheme s and sk2 which is embedded in the $EDP_{HID}$ which corresponds to the pk2. The new key sk2 can be stored in a corresponding memory 58 for this purpose. It should be noted that a shared resource use with the basic authentication system comes into consideration for this functionality. The response message 26 can thus be generated using the key sk1 or the key sk2.

An attacker is then confronted with the problem that a possible clone possesses no functioning block for $Dec_k$, assuming that the attacker was not able to verify the functionality of the circuit and implement it correctly. In this example aspect, the device either uses a secret key sk1 which is obtained from the NVM (for the basic authentication scheme), or can also use a secret key sk2 which is obtained from an EDP. The underlying algorithm is the same in both cases, e.g. ECDSA. Some components, e.g. comprising $Dec_k$ and $GEN\_SK_s$, can be protected against analysis through reverse engineering.

In an alternative example aspect, a secret key k' can be used to encrypt each host-specific $EDP_{HID}$. Hosts thus contain only the encrypted $EDP'_{HID}=Enc''_k(EDP_{HID})$ at the market launch. Each host does not necessarily then have to receive a specific $EDP_{HID}$/pk pair for the delayed feature activation, but instead, for example, the reception of only k' can suffice in order to unlock the existing, host-specific $EDP_{HID}$/pk pairs. Without access to k', it is not technically feasible to obtain the encrypted data, e.g. if a strong encryption, such as AES (Advanced Encryption Standard), is used.

One advantage of the described method is that it belies the assumption concerning key security. In this sense, every device in the prior art possesses a different key and the authenticity of the key is ensured by means of a digital certificate. If a key is lost, it can be copied and used for authentications which are accepted by any host. However, since the keys are now bound to a host, the generation of a functioning clone is not enabled even if an attacker can extract a key sk or v from a device. Since other hosts are provided with different EDP/pk pairs, the key is not accepted. In order to enable a cloned device (assuming that $DEC_k$ has not been cloned), a user would first have to extract sk which corresponds to the EDP of the host and transfer it into a clone. Alternatively, the user would have to replace the EDP/pk in a host with the one that was used to program the clone. Both options appear to be economically unviable.

Example aspects could consequently also be used as an additional security measure immediately after the market launch in order to deter attacks on the basic authentication (e.g. side-channel attacks or fault attacks). An attacker can no longer succeed by extracting a secret key from the asymmetric authentication system, since the functionality of $Dec_k$ must also be cloned. The attacker cannot anticipate the key that is used by the host system to which the clone will ultimately be applied. These features can further be achieved without cryptography or sophisticated secret key storage in the host. The only condition consists in the provision of hosts (or groups of hosts) with specific $EDP_{HID}$/pk pairs.

For the extended variability of example aspects, the $Dec_k$ circuit can be designed by means of a ROM mask. Additional data could be present in a ROM mask or through the use of protection mechanisms. This prevents the reuse of a chip for different application scenarios.

A device could be deactivated by the host using an analog feature (e.g. a high current) when the consumable is used up.

Example aspects enable the use of a public key scheme having a very short key length. Since each host now possesses a specific key, the value of the penetration of the cryptographic mechanism is substantially reduced. Even authentication protocols with elliptic curves having a length of at most 200 bits, at most 150 bits or 100 bits could consequently provide adequate security, since a cryptographic attack enables only a construction of clones which function with a specific host. The long-term secret is the functionality of $DEC_k$. No verification of certificates or transfer of public keys is further required for the invented method. This can reduce the code footprint of software on the host or on the device.

It is further noted that a value in the NVM could also be used as a secret input in $DEC_k$. This enables the use of one chip for a plurality of customers. This approach prevents a "crossover use". It should furthermore be noted that there is no need for a completely functional encryption/decryption which consists of a procedure for $ENC_k/DEC_k$. A secret function $y=f(x)$ is sufficient. The data packet, e.g. EDP, is then x and the value f(EDP) is the secret key sk.

Figure 13:
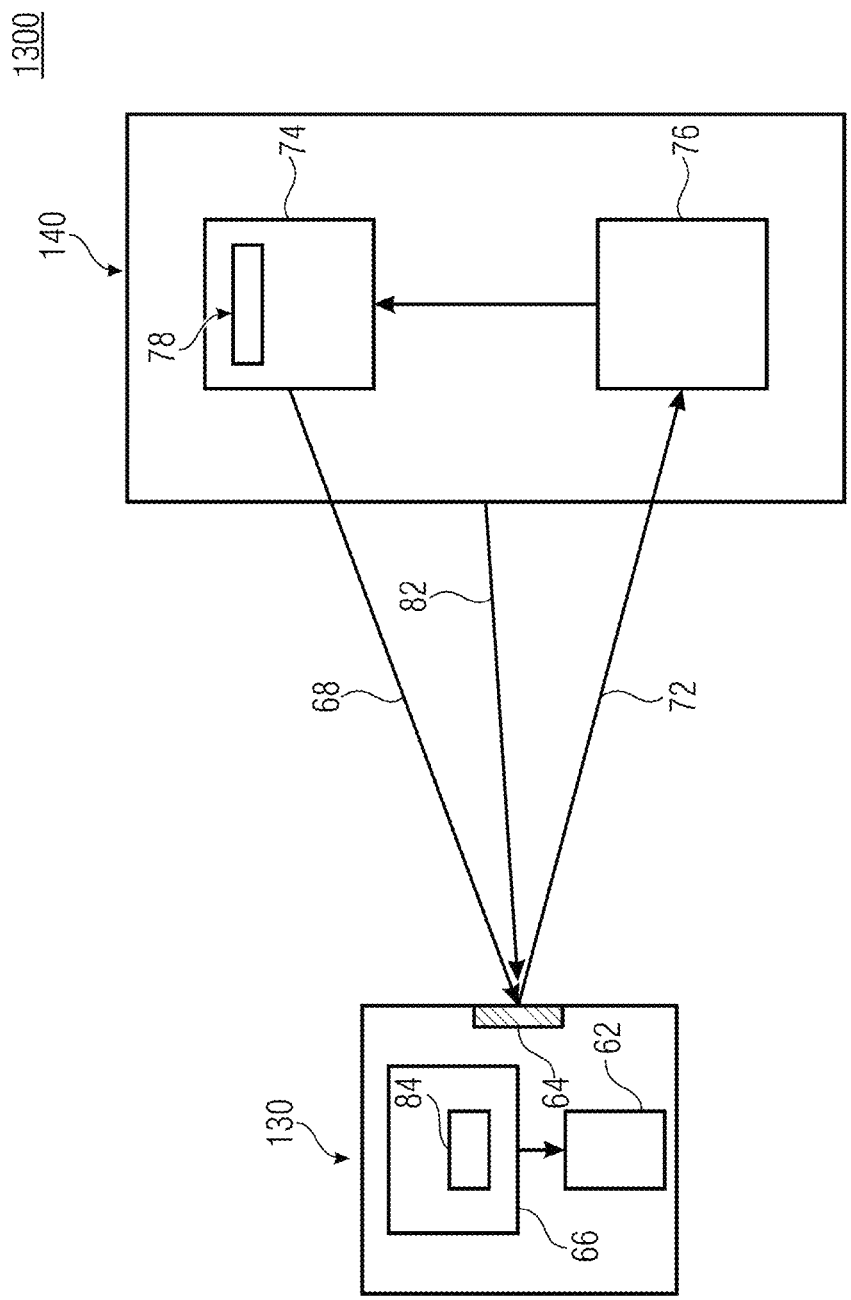
FIG. 13 shows a schematic block diagram of a system having a consumable with a one-time-programmable memory element and a consuming device according to one example aspect.

FIG. 13 shows a schematic block diagram of a system 1300 having a consumable 130 and a consuming device or host 140. The consumable 130 has a one-time-programmable memory element 62 (one-time programmable fuse), the state of which can be programmed or reprogrammed only once after a production process or after being changed to a reference state, at least within the intended operating conditions. Examples of such one-time-programmable memory elements are elements, the state of which is changed by means of mechanical, thermal and/or electrical severing (or joining) with regard to a physical state, for instance an electrical conductivity. Further examples are so-called "e-fuses", semiconductor elements or non-volatile memories which are designed for one-time passwords. The one-time-programmable memory element 62 may comprise, for example, a semiconductor element which is designed to permanently change an electrical property on the basis of an electrical signal.

The device 130 may be an extension of the device 110 explained by way of example in connection with FIG. 1, but the example aspects described in the present case can be implemented independently therefrom. Alternatively or additionally, the consuming device 140 may develop the device 120 explained by way of example in connection with FIG. 1, with this being optional.

In addition to the one-time-programmable memory element 62, the consumable has a data interface 64 which is configured to transmit and/or receive messages to or from the consuming device 140, as described in connection with example aspects above. The consumable 130 also has a data processing device 66 which is designed to carry out corresponding data processing. The data processing device 66 may be software-implemented and/or hardware-implemented and may comprise, for example, an application-specific integrated circuit (ASIC), a programmable gate array (field programmable gate array—FPGA), a processor, a microcontroller or the like.

The consuming device 140 may be designed to transmit a challenge message 68 to the consumable 130 which can receive the challenge message 68 using the data interface 64. The challenge message 68 may be, for example, the challenge message 24, wherein the challenge message is designed such that the consumable 130 is prompted to process the challenge message 68 by means of the data processing device 66 and to create a response message 72 in such a manner that the latter has, in answer to the challenge message 68, an item of cryptographic information derived from a state of the one-time-programmable memory element 62. The consumable 130 may be designed to obtain the cryptographic information on the basis of encryption and/or on the basis of use of a signature. The response message 72 may comprise at least parts of the information in the response message 26, for example. Even if the challenge message 68 and/or the response message 72 is/are configured differently, both messages may nevertheless be part of an authentication process.

This cryptographic information may indicate, for example, whether the one-time-programmable memory element 62 has been programmed, has been reprogrammed, and what physical value, for instance a resistance value or a temperature or the like, the one-time-programmable memory element 62 has, wherein such a state can be classified as a state by an evaluation logic unit which may be arranged, for example, in the consuming device 140. This means that the response message 72 can directly or indirectly provide information on the state of the one-time-programmable memory element 62. This information is transmitted cryptographically, which makes it more difficult to corrupt a corresponding item of information.

For this purpose, the system 1300 comprises a data memory 74. The consuming device 140 also comprises a control device 76 which can completely or partially implement functions of the control device 38.

The control device 76 is designed to evaluate the cryptographic information from the response message based on the state of the one-time-programmable memory element 62. This means that the control device 76 gains knowledge of the state of the one-time-programmable memory element 62 from the response message 72. On the basis of the state of the one-time-programmable memory element 62, the control device 76 determines an item of usage information which at least partially describes a future interaction with the consumable 130. The control device 76 is designed to store the usage information 78 in the data memory 74.

According to one example aspect, the usage information can indicate that cooperation or joint operation of the devices 130 and 140 is authorized or accepted. On the basis of this, the consuming device 140 can consume the resource of the consumable 130, for example. The challenge message 68 and/or the response message 72 may be part of an authentication process, which also makes it possible to identify the consumable 130. Alternatively, the consuming device 140 may have knowledge of what type or types of consumables 130 can be connected to it and/or can gain knowledge of details of the configuration of the consumable 130 in another manner, which makes it possible to determine, for example, an amount, a credit, a number of possible uses or the like.

Example aspects provide for the usage information 78 to be associated with a filling level or a number of remaining uses, with the result that a value, for instance a counter or the like, can be set as usage information 78, for example as the authentication result, which value, over the course of further operation or even during downtime during which the resource is consumed, ages or is otherwise changed, is stored and changed, for instance by incrementing and/or decrementing and/or comparing a changeable value with respect to a threshold value. During printing for example, it is possible to determine, ascertain or estimate consumption of the printer ink as a resource and to record this in the usage information 78 in the sense of decrementing a value. Operation can be reset, for example, upon reaching a value of zero or another value which indicates that the resource is consumed. It goes without saying that such descriptions are merely exemplary and that, instead of reaching a minimum value, for instance zero, for indicating that the resource has been used up, it is also possible to increase value to a maximum value which indicates that the resource has been used up.

According to example aspects, when storing the usage information 78, the consumable 130 is instructed to program the one-time-programmable memory element 62. In response to a new request within the scope of a challenge message 68, the consumable 130 therefore returns a different item of state information with the response message 72, which information can be interpreted by the consuming device 140 to mean that the consumable 130 has already been used. According to example aspects, this can be interpreted by the consuming device 140 as a different state, for instance a programmed state of the one-time-programmable memory element 62. The consuming device 140 may be designed not to store the usage information 78 in the data memory 74 or to store an item of information, which at least restricts the interaction with the consumable, in the data memory 74. For example, provision may be made for only certain functions of the consumable 130 to be usable, in which case it is conceivable that functions relevant to an emergency, for example, are retained, single-colored printing is enabled, while colored printing is prevented, or a delivered quantity of a resource of the consumable 130 is restricted or stipulated in another manner.

As described, the consuming device 130 can interpret the cryptographic information in the response message 72 as a state which indicates, for example, that the one-time-programmable memory element 62 has not been programmed. On the basis of this, the consuming device 140 may be designed to transmit a programming instruction 82 to the consumable 130. The programming instruction 82 may contain an instruction to reprogram the one-time-programmable memory element 62, such that a state other than the invariably assumed state is achieved. The consumable 130 may have a programming device 84 which is designed to program the one-time-programmable memory element 62. The programming device 84 may be part of the data processing device 66, but may also be a separate device. This means that the consumable is designed to program the one-time-programmable memory element 62 on the basis of the programming instruction 82.

The consumable 130 may be configured to cryptographically confirm the programming of the one-time-programmable memory element 62 to the consuming device 140 together with the response message 72 or a further message. For example, the programming instruction 82 may be part of the challenge message 68 or may be transmitted as a separate message, but before the response message 72 is returned. As part of the authentication, the consumable 130 can program the one-time-programmable memory element 62 and can transmit the original state and/or the programming which has been carried out and/or the new state with the response message 72. It is likewise conceivable for the programming instruction 82 to be transmitted, for example, after authentication has been carried out, for instance if stable communication between the devices 130 and 140 is ensured, with the result that it is possible to avoid the situation in which the consumable 130 programs the one-time-programmable memory element 62 but the latter cannot successfully report back.

The consuming device 140 may be designed to associate the usage information 78 with a filling level or a number of remaining uses and to store an associated value, which is aimed at this and is based on the programming instruction, in the data memory 74 as part of the usage information.

It is therefore possible for the usage information 78 to be updated continuously, iteratively or when particular events occur, which is advantageous, in particular, if the usage information is correlated with a filling level or a number of remaining uses of a resource of the consumable 130.

Example aspects provide for a consumable, for instance the consumable 130, to have a memory element, wherein the consumable is designed to store, in the memory element, an item of information which is correlated with a filling level or a number of remaining uses of the consumable. The consumable may be designed to transmit the information to the communication partner, for instance the consuming device 140. This means that the consuming device, for instance the consuming device 140, may be designed to query an item of filling level information from the consumable. The consuming device may be designed to compare this with its own usage information. For example, discrepancies between the remaining filling level stored in the consuming device 140 and the remaining filling level stored in the consumable 130 or the like can be corrected. This can be limited, for example, for instance in a discrepancy tolerance range of ±30%, ±20% or ±10%, for instance in order to prevent fraud attempts, by means of which the information in the consumable is manipulated.

The consuming device may be designed to update the usage information 78 on the basis of an interaction with the consumable which is carried out taking into account the usage information and is designed to consume a resource of the consumable. For this purpose, counter values can be decremented, a number of uses can be incremented or information can be collected in another manner, for example. As described, the usage information can be correlated with a filling level or a number of remaining uses of a resource of the consumable 130.

The consuming device 140 may be configured to carry out or refrain from a predetermined action upon reaching a predefined threshold value of the usage information. As explained below, in addition to outputting a warning signal to a user, for instance indicating that the resource will soon be used up, terminating future resource consumption processes or the like, it is also possible to transmit a further programming instruction to the consumable, said further programming instruction indicating that a further one-time-programmable memory element of the consumable should be programmed. In this respect, example aspects provide for the consumable 130 to have a plurality of individually addressable one-time-programmable memory elements.

The consumable 130 may be configured to create the response message in such a manner that the latter has cryptographic information derived from the respective state of the plurality of one-time-programmable memory elements. In this respect, it may be sufficient to indicate the one-time-programmable memory element which has just been programmed, with the result that it is possible to derive, from a ranking or sequence of the one-time-programmable memory elements, which of the one-time-programmable memory elements has/have possibly already been previously programmed and/or which of the one-time-programmable memory elements is/are still unprogrammed. Alternatively, a specific item of information relating to each of the one-time-programmable memory elements can also be arranged or inserted in the message. On the basis of a programming instruction received by means of the data interface 64, at least one of the plurality of one-time-programmable memory elements can be programmed in an element-specific manner by the consumable 31. In the case of a plurality or multiplicity of one-time-programmable memory elements for example, each of these elements can be associated with a certain proportion of a total filling level or total degree of use.

The consuming device 140 can therefore be designed to evaluate the cryptographic information from the response message 72 on the basis of a state of a plurality of one-time-programmable memory elements, each of which is associated with a different filling level of a resource of the consumable. The consuming device 140 can transmit a programming instruction to the consumable 130, which programming instruction indicates that that one-time-programmable memory element which is unprogrammed and is simultaneously associated with the highest filling level should be programmed, wherein the consuming device 140 can also be configured to store the usage information indicating the associated filling level in the memory 74. During a further interaction with the consumable 130, the associated filling level can be updated by changing the usage information 78.

In one example aspect in which the consumable has a number of 3 one-time-programmable memory elements provided for this purpose, this may be a third in each case, for example, wherein uneven proportions are also possible. This makes it possible for the consuming device, for example, upon expiry of the usage information 78 or upon reaching a predefined threshold value with the updated usage information, to program a further one-time-programmable memory element by means of a programming instruction aimed at this and, with confirmation, to update the usage information 78 such that a corresponding filling amount or a number of future uses associated with the newly programmed one-time-programmable memory element is stored as usage information again until it is likewise used up.

This results in a number of advantages. For example, the consumable 130 can be authenticated again, for instance after the failure of an energy supply, the replacement of the consuming device 140 or the transport of the consumable 130 to another consuming device 140. In this case, a filling level which is respectively assigned to the respective one-time-programmable memory element and was programmed and stored in the consuming device 140 as usage information 78 but has actually not yet been consumed, may be lost, for example, but it is possible to consume at least parts of a total filling level at another location. It is also possible to obtain defect safety since the failure of a single one-time-programmable memory element possibly does not result in failure of the entire consumable.

Figure 14:
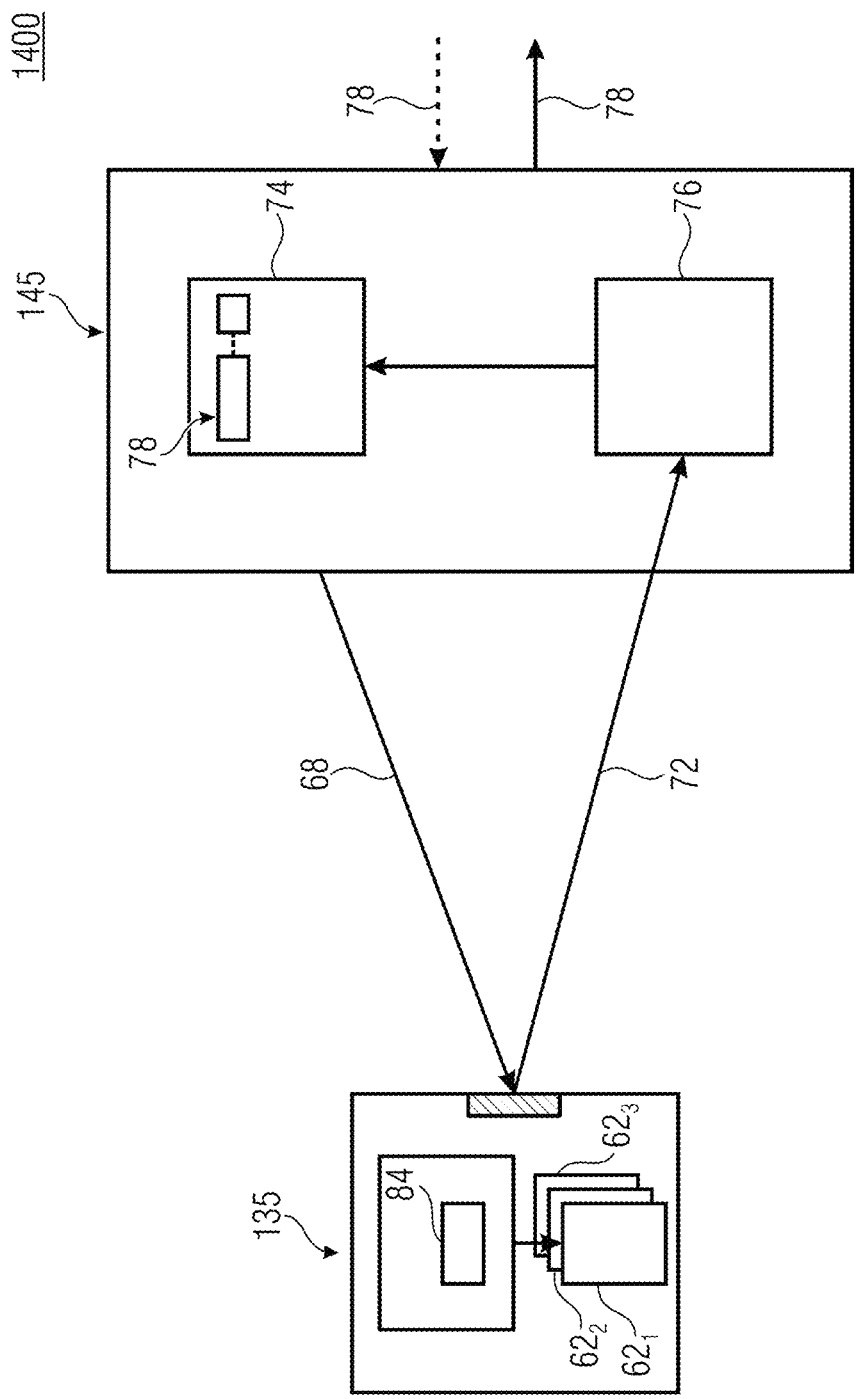
FIG. 14 shows a schematic block diagram of a system according to one example aspect, in which a consumable has a plurality of one-time-programmable memory elements.

FIG. 14 shows a schematic block diagram of a system 1400 according to one example aspect. By way of example, a consumable 135 has a plurality of, by way of example at least 2, at least 3, at least 4 or more, one-time-programmable memory elements $62_i$ with i=1, . . . l.

Irrespective of this, a consuming device 145 is designed to store the usage information 78 together with an identifier or an item of information which is correlated or associated with the consumable 130 or 135, with the result that the usage information 78 is associated with the identifier 86. The consuming device 145 may be designed to receive the identifier 86 from the consumable 135 or 130, to compare the identifier with a memory entry in the data memory 74, to read an item of usage information stored there together with the identifier 86 and to output the interaction with the consumable 130 or 135 on the basis of the usage information which has been read. The consuming device 145 may be designed to store a respective item of usage information together with an associated identifier of the consumable for a plurality or multiplicity of consumables.

This makes it possible, for example, to connect different consumables to the consuming device 145 in an alternating manner in terms of time, wherein information which was last stored in the data memory 74 (for instance before disconnection) in the case of renewed connection to the consumable 130 or 135 can then be reloaded into the data memory 74 again, for example, with the result that it is possible to dispense with the programming of a one-time-programmable memory element in this case. This can avoid unnecessary losses of resources by virtue of a new one-time-programmable memory element then being programmed, for example, upon reaching a threshold value of the usage information 78 in connection with the identifier 86 of the consumable 135 or if the consumable 130 or 135 has not yet been stored in the data memory 74 (that is to say no identifier is stored for said consumable or no usage information is known for said consumable).

Alternatively, the consuming device 145 may be optionally designed to transmit the usage information 78 to another device, for example a storage medium, in particular a removable storage medium, a data network, for instance a local area network or the Internet, or other receivers. This makes it possible to transport the consumable 130 or 135 to another device or to another consuming device which is designed to receive the usage information, preferably in conjunction with the identifier 86, with the result that it is also possible to dispense with the programming of a one-time-programmable memory element in this case. In this respect, the consuming device 145 may be designed to receive the usage information 78 from another device and to store it in an internal memory, for instance the data memory 74, for a future interaction with the consumable.

The systems 1300 and 1400 have been described in such a manner that, when a consumable 130 or 135 is connected again or reconnected to a corresponding consuming device 140 or 145, authentication is carried out using the challenge message 68 and the response message 72. Example aspects provide for authentication to be carried out cyclically, for instance after expiry of a particular interval of time, after expiry of a particular number of uses or after consumption of a certain amount of the resource of the consumable. Alternatively or additionally, example aspects provide for the state of at least one of the one-time-programmable memory elements in the consumable to be cyclically queried by means of a challenge message, for instance during preparation, during use or during follow-up of use of the stored resource. The consuming device may be designed to transmit a new challenge message 68 to the consumable at least sporadically or else cyclically or in any event in order to interact with the consumable.

Further example aspects relate to a consuming device and example aspects which go beyond the latter relate to a consumable. The consuming device may be formed, for example, in accordance with the consuming device 140 and/or 145 and may be designed to transmit a programming instruction to the consumable as the communication partner. In connection with this, the usage information 78 can be stored in the memory 74 in order to at least partially describe the future interaction with the communication partner.

The consumable may be formed in accordance with the consumable 130 or 135 and may be designed, in particular, to obtain the cryptographic information from the response message 72 on the basis of encryption and/or on the basis of use of a signature.

Figure 15:
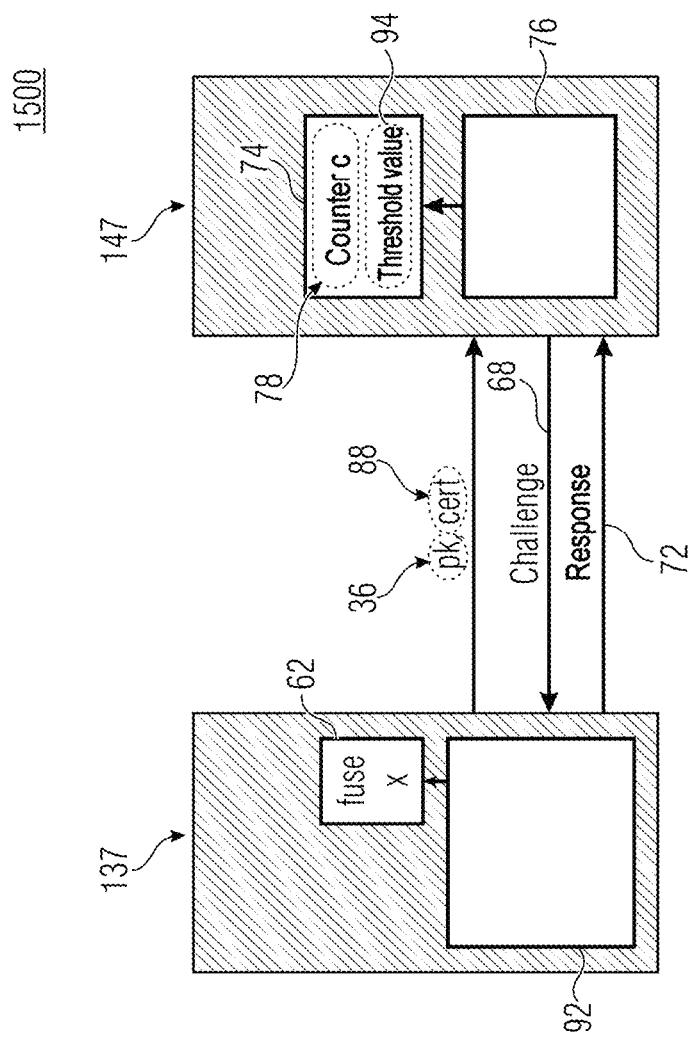
FIG. 15 shows a schematic block diagram of a system according to one example aspect, in which a consumable is formed as a printer cartridge and a consuming device is formed as a printer.

FIG. 15 shows a schematic block diagram of a system 1500 according to one example aspect, in which a consumable 137 is formed as a printer cartridge and a consuming device 147 is formed as a printer. Although authentication methods can also be implemented, for example, according to other example aspects described by way of example in connection with FIG. 2, the consuming device 147 can receive the key 36, for example, together with a certificate cert 88. Using an authentication device 92 which can also be modified toward the authentication device 22, the control device 76, which can also be called a verification device, can, with the further aid of the challenge message 68 and the response message 72, be designed to determine the usage information 78 and to store it in the data memory 74. One or more threshold values 94 may also be optionally stored in the data memory 74, for instance values which determine when a further one-time-programmable memory element should be programmed or the like.

Figure 16:
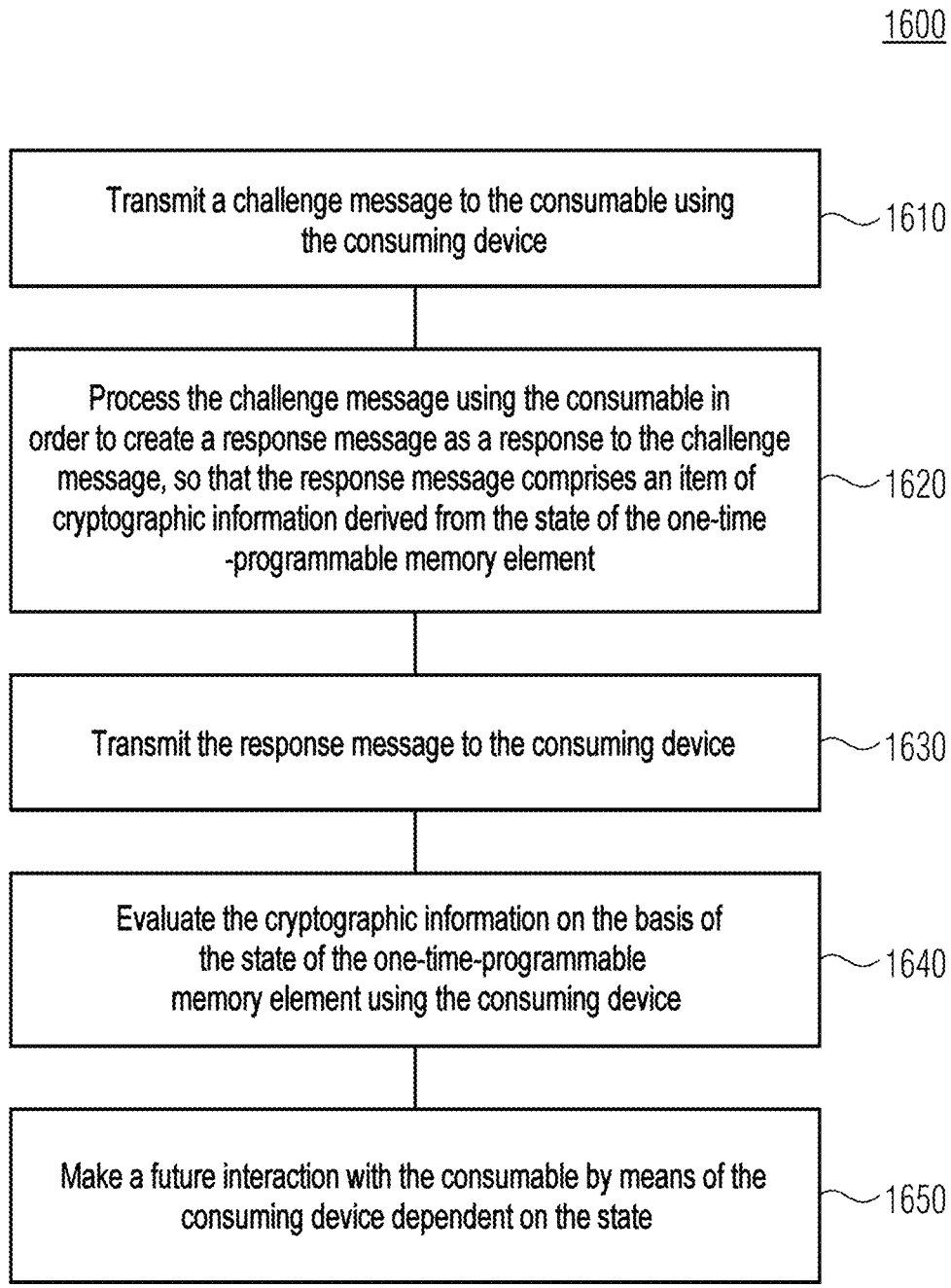
FIG. 16 shows a schematic flow diagram of a further method according to one example aspect.

FIG. 16 shows a schematic flow diagram of a method 1600 according to one example aspect. A step 1610 comprises transmitting a challenge message to the consumable using a consuming device. A step 1620 comprises processing the challenge message using the consumable in order to create a response message as a response to the challenge message, with the result that the response message has an item of cryptographic information derived from a state of the one-time-programmable memory element. A step 1630 comprises transmitting the response message to the consuming device. A step 1640 comprises evaluating the cryptographic information on the basis of the state of the one-time-programmable memory element using the consuming device. A step 1650 comprises making a future interaction with the consumable by means of the consuming device dependent on the determined state. Such a method can be carried out, for example, using the system 1300, 1400 or 1500.

Whereas known authentication devices allow a counter value to be stored in a non-volatile memory and the counter can be used to determine an expected amount of further consumptions (for example ink counters or remaining service life of a device), example aspects described herein relate to the practice of determining such information on the part of the consuming device, which does not exclude a corresponding item of information additionally and alternatively remaining in the consumable. An aim of example aspects described herein is, for example, to prevent or make it difficult to refill the consumable or to reuse chips of consumed consumables. This may entail safety risks, in particular in connection with medicaments or the like. If, according to example aspects, a counter indicates an empty filling level or exceeds a threshold value (for example with regard to service life/shelf life), the consuming device can refuse or restrict further cooperation with the consumable in order to thus trigger replacement of the consumable.

Example aspects enable a cost-efficient approach for determining a filling level of a consumable present in the device and make this possible with a small number of hardware elements in the devices. For this purpose, example aspects combine one-time-programmable memory elements or fuses in the consumable together with a cryptographic authentication method which is carried out between the consumable and the consuming device. Furthermore, counters or shadow counters can be implemented on the consuming device and indicate the extent of further use, as described in connection with the usage information 78. In this context, example aspects can use existing authentication mechanisms and can also monitor the state of the consumable, in particular by querying the state of the one-time-programmable memory element. Authentication processes can be carried out using known challenge-response protocols which use ECDSA for example. In example aspects, the consuming device is used to monitor the possibility of further use and/or the filling level. According to example aspects, the consumables have a one-time-programmable memory element (fuse). It should be noted in this case that a fuse is not used in a restrictive manner to mean that a physical technology of a fuse or anti-fuse is used, but rather it is possible to use any permanent memory element which is designed to store at least one bit of information on the device as a "fuse". This fuse is possibly not set or tripped during production of the consumable (for instance for $x=0$) and can be set once to another state (for instance $x=1$ or the other way round) when the consumable is used in the field. The corresponding fuse, one-time-programmable memory element, does not allow any simple resetting by the user. The consuming devices support a so-called shadow counter c or counter or usage information which can be stored in a memory of the consuming device and is initially set, for example, to $c=0$, for instance during production of the consuming device. In addition, a consuming device may support a value t which indicates, for example, a number of ink drops in order to determine how many units or elements of a consumable can be consumed for each consumable.

If the consuming device starts operating, for example, or if a consumable is brought into contact with or is inserted into the consuming device, the consuming device can check whether or not the fuse of the consumable has already been set, that is to say whether it has been set or has not been set. The consuming device can use the cryptographic authentication protocol to gain cryptographic reassurance that the status of the fuse is correctly indicated by the consumable.

Within such a scenario, there are a plurality of possibilities for the further procedure:

State A: $c=*$ and $x=0$: the counter has any value (indicated by *) and the fuse x of the consumable has not been set. During normal operation, this is carried out when a (non-fraudulent) user connects a new or unused consumable to the consuming device. The consuming device then sets the value of the fuse to $x=1$ and sets the counter to the value t, that is to say $c=t$. As a result, the shadow counter of the consuming device can be set to a threshold value. In order to ensure that the fuse has been set to the value $x=1$, the consuming device can use the cryptographic authentication protocol to obtain cryptographic assurance with regard to the state of the fuse from the consumable. The system may now be in state B.

State B: c>0 and x=1: the counter has a value of greater than 0 and the fuse of the consumable has already been set. During normal operation, this is carried out when the (non-fraudulent) user has already used the consumable (for instance by printing a pair of pages and then switching off the printer and now switching it on again). The user can now trigger operation which triggers consumption of the consumable or the resource. In this case, the consuming device carries out operation and decrements the counter c, with the result that c=c−1 (or any other notation indicated). If c=0 is reached, the system is now in state X. Otherwise, the system remains in state B.

State C: C=0 and X=1: the counter has reached the value 0 and the fuse has already been set. The consuming device at least partially refuses the performance of further actions, for instance those which would further empty the consumable. The consuming device can inform the user that a new consumable should be inserted. State C can be left when the user inserts a consumable having a fuse which has not been set (or if the consumable has a further fuse which has not yet been set). In this state, the system returns to state A or B.

Provision may therefore be made for the consuming device to set the internal shadow counter to "c=t" and to allow the use of the consumable only when the fuse has not been set. This may prevent renewed use of old consumables and/or may prevent or hinder refilling attacks since no cost-efficient ways of resetting the fuse can be implemented. This can be carried out without an individual and unique ID for each consumable. Irrespective of this, provision may be made for a corresponding ID or identifier to be stored, for instance in order to make it possible to use a plurality of consumables.

Example aspects are based on the fact that cryptographic authentication protocols have sufficient security to be protected against clones, for instance by virtue of the secret key not being known. Otherwise, other example aspects described herein can also be used to increase security. The cryptographic reassurance from the consumable with regard to the state of the fuse can be effected in such a manner that, for example in connection with an ECDSA-based protocol, the consumable does not only sign the challenge message but also the state of the one-time-programmable memory element in order to return this at least as part of the response message.

As already mentioned, example aspects can nevertheless be combined with an identifier (unique ID) of the consumable. The consuming device may support a counter c for each consumable o as a tuple (c, o). The consuming device may, for example, make the use of the consumable dependent on whether the identifier u is associated with a counter which has a value of c>0.

Example aspects can be used in systems in which a user uses an authentication chip which is arranged on a consumable. This provides advantages, in particular, in cases in which consumables are not intended to be changed between consuming devices, for example on the basis of security requirements. Example aspects can be provided in a cost-efficient manner and can nevertheless provide a high degree of security.

Example aspects can be used for:
improving the security of products with a basic authentication mechanism providing delayed function activation, and
single use for highly cost-effective authentication for devices without NVM or with only a very restricted non-volatile memory.

Although some aspects have been described in connection with a device, these aspects obviously also represent a description of the corresponding method, so that a block or a component of a device should also be understood as a corresponding method step or as a feature of a method step. Similarly, aspects that have been described in connection with or as a method step also represent a description of a corresponding block or detail or feature of a corresponding device.

Depending on specific implementation requirements, example aspects of the disclosure can be implemented in hardware or in software. The implementation can be carried out using a digital storage medium, for example a floppy disk, a DVD, a Blu-ray disc, a CD, a ROM, a PROM, an EPROM, an EEPROM or a FLASH memory, a hard disk or a different magnetic or optical storage device on which electronically readable control signals are stored which can interact or interact with a programmable computer system in such a way that the respective method is carried out. The digital storage medium can therefore be computer-readable. Some example aspects according to the disclosure therefore comprise a data medium which has electronically readable control signals which are capable of interworking with a programmable computer system in such a way that one of the methods described herein is carried out.

Example aspects of the present disclosure can generally be implemented as a computer program product with a program code, wherein the program code is effective in carrying out one of the methods when the computer program product runs on a computer. The program code can also be stored, for example, on a machine-readable medium.

Other example aspects comprise the computer program for carrying out one of the methods described herein, wherein the computer program is stored on a machine-readable medium.

In other words, one example aspect of the method according to the disclosure is therefore a computer program which has a program code to carry out one of the methods described herein when the computer program runs on a computer. A further example aspect of the method according to the disclosure is therefore a data medium (or digital storage medium or a computer-readable medium) on which the computer program to carry out one of the methods described herein is recorded.

A further example aspect of the method according to the disclosure is therefore a data stream or a sequence of signals which represent(s) the computer program to carry out one of the methods described herein. The data stream or the sequence of signals may, for example, be configured in such a way as to be transferred via a data communication connection, for example via the Internet.

A further example aspect comprises a processing device, for example a computer or a programmable logic component which can be configured or adapted in such a way as to carry out one of the methods described herein.

A further example aspect comprises a computer on which the computer program to carry out one of the methods described herein is installed.

In some example aspects, a programmable logic component (for example a field-programmable gate array, an FPGA) can be used to perform some or all functionalities of the methods described herein. In some example aspects, a field-programmable gate array can interwork with a microprocessor to carry out one of the methods described herein. In some example aspects, the methods are generally carried out by any given hardware device. This may be universally usable hardware such as a computer processor (CPU) or hardware specific to the method, such as, for example, an ASIC.

The example aspects described above merely represent an illustration of the principles of the present disclosure. Modifications and variations of the arrangements and details described herein will obviously be evident to other persons skilled in the art. The disclosure is therefore intended to be limited only by the scope of protection of the patent claims set out below, and not by the specific details that have been presented by way of the description and the explanation of the example aspects herein.

The invention claimed is:

1. A system, comprising:
   at least one consumable, comprising:
   a plurality of one-time-programmable memory elements;
   a data interface designed to receive a challenge message from a consuming a data processor designed to:
   device; and
   process the challenge message; and
   create a response message as a response to the challenge message such that the response message has an item of cryptographic information derived from a state of at least one of the plurality of one-time-programmable memory elements,
   wherein the consumable is designed to transmit the response message to the consuming device; and
   the consuming device comprising:
   a data memory; and
   a controller designed to:
   transmit the challenge message to the consumable;
   evaluate the cryptographic information on the basis of the state of the at least one of the plurality of one-time-programmable memory elements;
   determine, on the basis of the state of the at least one of the plurality of one-time-programmable memory elements, an item of usage information which at least partially describes a future interaction with the consumable;
   store the usage information, which indicates an associated filling level, in the data memory;
   transmit a programming instruction to the consumable, which programming instruction indicates that an unprogrammed one-time-programmable memory element associated with the highest filling level should be programmed; and
   update the associated filling level during further interaction with the consumable by changing the usage information in the data memory.

2. The system as claimed in claim 1, wherein the consuming device is designed to authenticate the consumable using the challenge message and the response message.

3. The system as claimed in claim 1, wherein the consuming device is designed to cyclically query the state of the at least one of the plurality of one-time-programmable memory elements in the consumable by means of the challenge message.

4. The system as claimed in claim 1, wherein the consuming device is designed to:
   interpret the cryptographic information as a first state of the at least one of the plurality of one-time-programmable memory elements,
   transmit a programming instruction to the consumable, which programming instruction has an instruction to reprogram the at least one of the plurality of one-time-programmable memory elements into a second state, and
   determine the item of usage information as a value which is associated with a filling level or a number of remaining uses and is based on the programming instruction, and store the item of usage information in the data memory.

5. The system as claimed in claim 4, wherein the consuming device is designed to interpret the cryptographic information as the second state of the at least one of the plurality of one-time-programmable memory elements, and to not store the item of usage information in the data memory, or to store an item of information in the data memory that at least restricts the interaction with the consumable.

6. The system as claimed in claim 4, wherein the consuming device is designed to query an item of filling level information from the consumable and to compare it with the usage information.

7. The system as claimed in claim 4, wherein the consuming device is designed to store the item of usage information in a manner associated with an identifier of the consumable in the data memory.

8. The system as claimed in claim 7, wherein the consuming device is designed to store a respective item of usage information together with an associated identifier of the consumable for a multiplicity of consumables.

9. The system as claimed in claim 4, wherein the consuming device is designed to update the usage information on the basis of an interaction with the consumable, which took place taking into account the usage information, in order to consume a resource of the consumable.

10. The system as claimed in claim 9,
    wherein the usage information is correlated with the filling level or the number of remaining uses of the resource of the consumable, and
    wherein the consuming device is configured to transmit a further programming instruction to the consumable upon reaching a predefined threshold value of the usage information, which further programming instruction indicates that a further one-time-programmable memory element of the consumable should be programmed.

11. The system as claimed in claim 9, wherein the consuming device is designed to transmit a new challenge message to the consumable for the interaction.

12. The system as claimed in claim 4, wherein the consuming device is designed to transmit the usage information to another device, and/or to receive the usage information from another device and to store it in an internal memory of the device for a future interaction with the consumable.

13. The system as claimed in claim 1, wherein the consuming device is designed to receive an identifier from the consumable, and to compare the identifier with a memory entry in the data memory in order to read the item of usage information stored there together with the identifier, and to carry out the interaction with the consumable on the basis of the usage information which has been read.

14. The system as claimed in claim 1, wherein the challenge message and the response message are part of an authentication process.

15. The system as claimed in claim 1, wherein the consumable has a programming device which is designed to program the plurality of one-time-programmable memory elements.

16. The system as claimed in claim 15, wherein the consumable is configured to program the plurality of one-time-programmable memory elements in response to a programming instruction received by means of the data interface using the programming device.

17. The system as claimed in claim 16, wherein the consumable is configured to cryptographically confirm the programming of the plurality of one-time-programmable memory elements to the consuming device together with the response message or a further message.

18. The system as claimed in claim 1, wherein the consumable is configured to create the response message in such a manner that the latter has cryptographic information derived from the respective state of the plurality of one-time-programmable memory elements.

19. The system as claimed in claim 1, wherein the consumable is designed to program at least one of the plurality of one-time-programmable memory elements in an element-specific manner on the basis of a programming instruction received by means of the data interface.

20. The system as claimed in claim 1, wherein each of the plurality of one-time-programmable memory elements comprises a semiconductor element which is designed to permanently change an electrical property on the basis of an electrical signal.

21. The system as claimed in claim 1, wherein the consumable is designed to obtain the cryptographic information on the basis of encryption and/or on the basis of use of a signature.

22. The system as claimed in claim 1,
wherein the consumable has a memory element and is designed to store an item of information, which is correlated with a filling level or a number of remaining uses of the consumable, in the memory element, and
wherein the consumable is designed to transmit the information to the consuming device.

23. A device, comprising:
a data memory;
a data interface configured to exchange messages with a communication partner; and
a controller designed to:
transmit a challenge message to the communication partner using the data interface;
receive, on the basis of the challenge message, a response message which has an item of cryptographic information indicating a state of at least one of a plurality of one-time-programmable memory elements, each of which is associated with a different filling level of a resource of the communication partner;
evaluate the cryptographic information on the basis of the state of the at least one of the plurality of one-time-programmable memory elements, and make a future interaction with the communication partner dependent on the state;
interpret the cryptographic information as a first state of the at least one of the plurality of one-time-programmable memory elements;
transmit a programming instruction to the communication partner, which programming instruction has an instruction to reprogram the at least one of the plurality of one-time-programmable memory elements into a second state;
store an item of usage information, which at least partially describes the future interaction with the communication partner, in the data memory, wherein the usage information is correlated with a filling level or a number of remaining uses of a consumable of the communication partner,
transmit a programming instruction to the communication partner, which programming instruction indicates that an unprogrammed one-time-programmable memory element that is associated with the highest filling level should be programmed, and store an item of usage information, which indicates the associated filling level, in the data memory; and
update the associated filling level during further interaction with the consumable of the communication partner by changing the usage information in the data memory.

24. A method for operating a system having a consumable and a consuming device, comprising:
transmitting a challenge message to the consumable using the consuming device;
processing the challenge message using the consumable in order to create a response message as a response to the challenge message, with the result that the response message has cryptographic information derived from a state of at least one of a plurality of one-time-programmable memory elements;
transmitting the response message to the consuming device;
evaluating the cryptographic information on the basis of the state of the at least one of the plurality of one-time-programmable memory elements, each of which is associated with a different filling level of a resource of the consumable, using the consuming device, and
making a future interaction with the consumable by means of the consuming device dependent on the state;
transmitting a programming instruction to the consumable, which programming instruction indicates that an unprogrammed one-time-programmable memory element associated with the highest filling level should be programmed;
storing an item of usage information, which indicates the associated filling level, in a memory of the consuming device; and
updating the associated filling level during further interaction with the consumable by changing the usage information.

25. A non-transitory computer readable medium having stored thereon a computer program having a program code to carry out the method as claimed in claim 24 when the computer program runs on a computer.

* * * * *